SUPERVISORY CIRCUIT

Filed July 1, 1959 3 Sheets-Sheet 1

INVENTORS F. P. CIRONE
J. A. HARR
T. N. LOWRY
P. G. RIDINGER
BY
ATTORNEY

INVENTORS F. P. CIRONE
J. A. HARR
T. N. LOWRY
P. G. RIDINGER
BY [signature]
ATTORNEY INVENTORS F. P. CIRONE
J. A. HARR
T. N. LOWRY
P. G. RIDINGER
BY [signature]
ATTORNEY

United States Patent Office 3,114,007

Patented Dec. 10, 1963

3,114,007

SUPERVISORY CIRCUIT

Frank P. Cirone, Dover, John A. Harr, Morris Plains, and Terrell N. Lowry and Philip G. Ridinger, Boonton, N.J., assignors to Bell Telephone Laboratories, Incorporated, New York, N.Y., a corporation of New York Filed July 1, 1959, Ser. No. 824,294
31 Claims. (Cl. 179—18)

Figure 1:
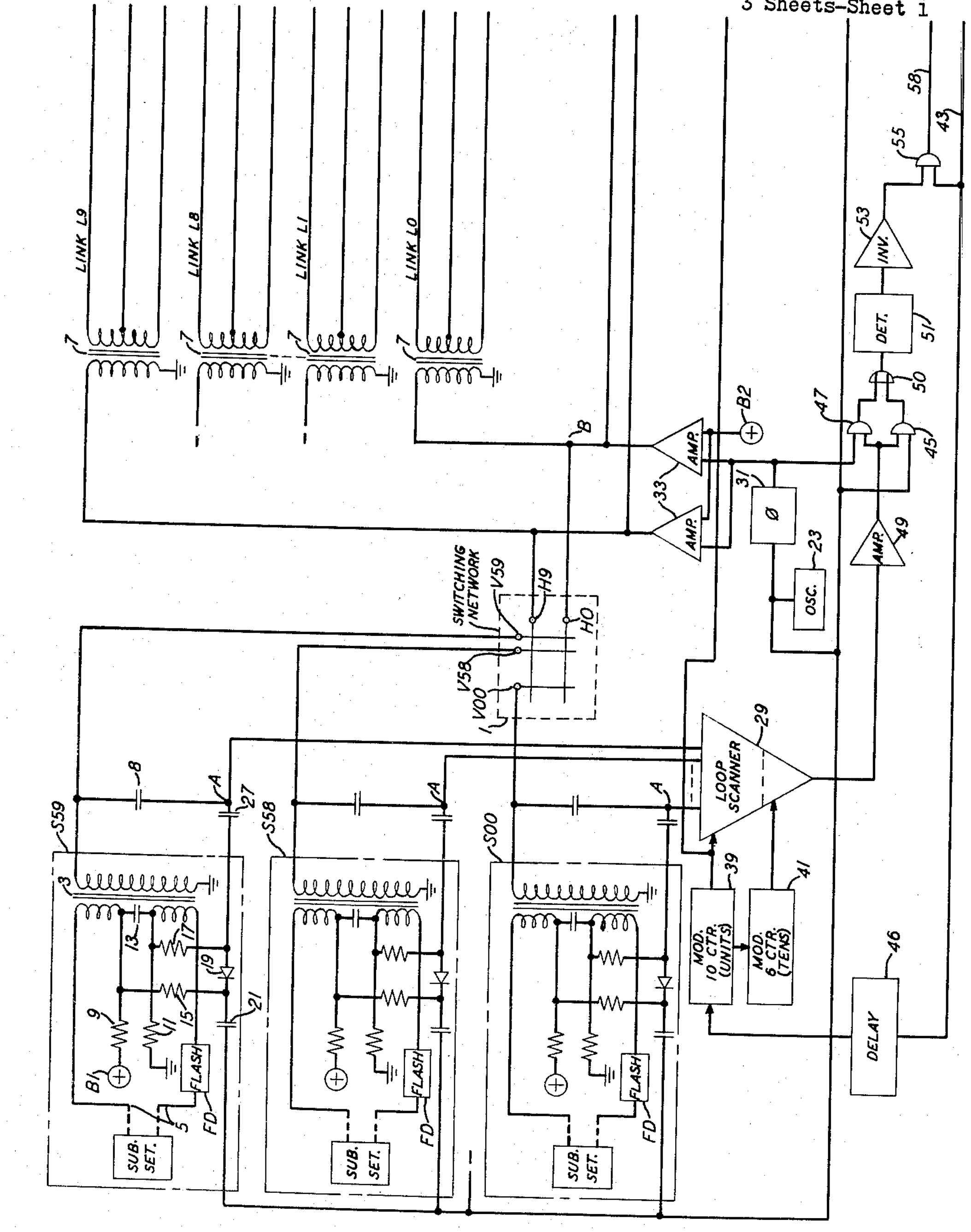

This invention relates to telecommunication systems and more particularly to supervisory systems to be employed in telecommunication systems for transmitting intelligence of a supervisory nature from a remote location to a central control location.

In various types of telecommunication systems, it is necessary that an indirect control of a plurality of units, such as subscriber telephone lines be effected by a central control location remote from these units and not in direct electrical connection therewith. The plurality of units are terminated in and directly controlled by a remote station which is, in turn, directly controlled by the central control location. Generally supervision information with respect to these remote units has been transmitted to the central control location in the form of information identifying the immediate state conditions of these units. In accordance with our invention, as set forth in detail subsequently, the intelligence transmitted is indicative of the particular change conditions of these units, as distinguished from immediate state conditions, and the central location receives such intelligence as change information relating to a particular unit.

The central location takes necessary action in cognizance of such determined change condition to regulate the operation of the remote unit by the transmission of control intelligence indicating such operation to the remote station. Such control intelligence is developed at the central office location upon an awareness of the particular change in the operation of a particular one of the units and the action required to be taken by the remote station thereon.

The present invention finds practical application in automatic telephone systems of the type where either a single or multiple concentration of a plurality of served substations is had through a smaller number of trunks emanating from the central office location. While the description of this invention will be given in conjunction with line concentrator telephone systems, it will become evident that the concepts herein contained may find application in any system wherein a supervision of the change condition of each of a plurality of units is desired at a central location to which such units are normally unconnected.

In line concentrator telephone systems, a portion of the switching equipment is located remotely from the central office location and operates as a slave unit with respect thereto to affect a connection between one of a plurality of substations served thereby and an idle line emanating from the central office location. The supervisory systems priorly employed in such telephone systems are situated partly at the remote location and partly at the central office location. The intelligence provided by such prior systems to the central office location, however, is in the form of state condition information, i.e., on-hook or off-hook, and further processing thereof is necessary to convert such information to change condition information, i.e., service request, answer, hang-up, and flashing. A conversion from state condition information to change condition information at the central office location is requisite to the determination thereat of necessary actions to be performed by the switching equipment and the generation and transmission of appropriate control intelligence thereto for initiating such actions. A conversion from state condition to change condition is effected at the central office location by continuously sampling the immediate state condition of the substation which is compared with the state condition thereof as determined by a previous sampling stored in appropriate memory units thereat.

The main impetus given to the employment of line concentrator telephone systems has been the attempt to reduce the unit cost per substation. In present day telephone systems, a large portion of the unit cost per substation is directly attributable to the cost of installation and operation of the individual links used to interconnect the individual substations to the central office location. This unit cost per substation has been substantially reduced in line concentrator telephone systems through the sharing by a plurality of substations of a fewer number of links to which each may be selectively connected to the central office location. However, a portion of such unit cost per substation can still be laid to the cost of complex supervisory systems employed in line concentrator telephone systems for the determination of the change conditions of the served substations. For example, present day line concentrator telephone systems utilize control pairs of wires for the continuous transmission on a time division basis of the state condition of the served substations from the scanning means of the line concentrator unit to the central office location; necessitate complex units at the central office location to effect a reception, comparison and conversion of the received state condition information to change condition information; require a direct-current connection between the central office location and a substation upon a communication connection having been established for the continuous supervision of the state condition of a substation at the central office location; utilize additional scanning means at the central office location for a sampling of such communication connection to determine the immediate state condition of the particular substation; and require the addition of means to insure the proper maintenance and operation of the switching equipment of the line concentrator unit.

A general object of this invention is the direct determination of the change condition of a plurality of substations served in a line concentrator telephone system.

More specifically, it is an object of this invention to provide supervisory means wherein the change condition, as distinguished from the immediate state condition, of each of a plurality of substations served in a line concentrator telephone system may be directly transmitted to the central office location.

Another object of this invention is to provide supervisory means for line concentrator telephone systems of the type wherein alternating-current coupled networks are employed as communication paths.

Still another object of this invention is to provide a supervisory means for line concentrator telephone systems wherein the operation of the switching network of the line concentrator unit may be simultaneously monitored in addition to the change condition of each substation being directly determined.

A further object of this invention is to provide for the supervision of a plurality of substations served by a line concentrator telephone system, such supervision being effected through a transmission of a minimum of intelligence between the line concentrator unit and the central office location in such system.

A still further object of this invention is to provide a supervisory means for line concentrator telephone systems wherein the effect of spurious pulses is eliminated.

The specific objects of this invention are achieved by the provision of means for continually generating a first and second series of superaudible frequency pulses to be each directed oppositely between the loop terminals and the link terminals, respectively, of the switching network of a line concentrator unit and for monitoring on a time basis the appearance of such pulses at each of these terminals to develop supervisory information. The appearance of the first and second series of pulses, which have no logical significance in themselves, through the switching network is conditioned upon the closure of a particular one of the crosspoint connections therein and upon the immediate state condition of the substation to which a communication connection has been provided therethrough. The source of the first series of pulses is connectable to the loop terminals of the switching network through a plurality of transmission gates associated one with each substation or with each group of substations provided with party line service. Each transmission gate is responsive to currents in the associated substation loop to inhibit or allow the appearance of the first series of pulses at the loop terminals of the switching network during an off-hook and an on-hook state condition, respectively, thereof. The source of the second series of pulses is directly connected to the link terminals of the switching network. A feature of this invention relates to the provision of means for generating the first and second series of pulses to appear on both the loop terminals and the link terminals, respectively, of the switching network of a line concentrator unit to serve as monitoring signals.

Another feature of this invention relates to the provision of scanning means for the loop terminals of the switching network, which means is operative to direct an intelligence pulse to the central office location in response to the absence of both the first and second series of pulses thereat. The loop scanning means operates to directly indicate a service request change condition of a substation to the central office location upon the absence of the first series of pulses at the loop terminals of the switching network resulting from the inhibitive action of the transmission gate associated therewith. At this time, the second series of pulses is also absent from the loop terminal of the switching network as the crosspoint connection to be provided for the communication connection remains open for a short interval of time prior to the closure thereof by the central office location. Upon the closure of the crosspoint connection, the second series of pulses appears at the loop terminals of the switching network to inhibit the loop scanning means for the duration of closure thereof. Accordingly, the detection of the second series of pulses by the loop scanner means is indicative of the continuity of crosspoint closure and provides for the monitoring thereof. A false opening of the crosspoint connection during a communication interval for any reason causes the loop scanning means to direct an intelligence signal to the central office which is distinguishable thereat as a crosspoint failure indication. The signals developed by the loop scanning means to indicate a service request condition and a crosspoint failure are identical. However, this ambiguity is resolved by another feature of this invention which relates to the provision of appropriate memory circuits at the central office location adapted to recognize the proper sequence of substation change conditions for originating and terminating calls. Accordingly, a second reception of an intelligence signal from the loop scanning means subsequent to a direction by the central office location for the establishment of a communication connection and, similarly, upon the closure of a crosspoint connection and prior to the proper release thereof is resolved to indicate a crosspoint failure.

Still another feature of this invention relates to the provision of scanning means for the link terminals, which means is responsive only to the first series of pulses appearing on the loop terminals of the switching network. The crosspoint connection associated with a communication connection to a particular substation is necessarily closed prior to a hang-up change or an answer change condition in the operation of that substation. Further, the immediate state conditions of the substation are necessarily opposite prior to the hang-up change and answer change conditions, i.e., the substation is necessarily on-hook prior to an answer change condition and off-hook prior to a hang-up change condition. Thus, due to the peculiar operation of the transmission gate assocated with each substation, a hang-up change condition of particular substation, i.e., a change from off-hook state condition to on-hook state condition subsequent to the establishment of a communication connection thereto, is indicated by the appearance following an absence of the first series of pulses at the link terminals of the switching network. Similarly, but conversely, an answer change condition, i.e., a change from an on-hook state condition to off-hook state condition subsequent to the establishment of a communication connection thereto, is indicated by the absence following the appearance of the first series of pulses at the link terminals of the switching network. Accordingly, answer and hang-up change conditions are characterized by a previous closure of the crosspoint connection, which in effect operates as a memory element, and the absence or appearance, respectively, following an opposite state of the first series of pulses on the link terminals of the switching network. The link scanning means is operative to direct the first series of pulses appearing at the link terminals of the switching network to coincidence gating and detector means associated therewith.

A further feature of this invention relates to the provision of coincidence gating and detector means associated with and responsive to each of the loop scanning and link scanning means. To reduce the susceptibility of the supervisory system to spurious pulses, the outputs of each of the loop scanning means and link scanning means are applied to associated gating means to which are coincidently applied those pulses of the first and second series to which each is intended to be responsive. Accordingly, the first and second series of pulses are employed as local reference signals in addition to being employed as monitoring signals by the supervisory system. The detector means are responsive to the coincidence gating means to develop a characteristic indication of the appearance of the first and second series of pulses through the loop scanning and link scanning means.

A still further feature of this invention relates to the provision of memory and logic circuitry means at the remote location for the direct determination of a change condition in the operation of a particular substation and the generation of characteristic indications thereof. As the absence of the first series of pulses at a particular loop terminal and a corresponding link terminal connected thereto through the switching network is indicative of the substation state condition, the logic circuitry means are provided with inverter means to provide a positive characteristic indication of the absence of a direct-current potential at the output of each of the detectors associated with the loop scanning means and link scanning means. With respect to the generation of characteristic indications of a hang-up change and answer change conditions of a substation, scanning selector means are provided to nondestructively read out on a time basis the memory means in which are recorded the prior state conditions, i.e., first series of pulses present or absent, of each link during the progress of a call. The output of the scanning selector means is directed to the logic circuitry means which are operative to compare such reading with the output of the detector means associated with the link scanning means. The logic circuitry means are adapted to develop appropriate change condition indications if there is disagreement between the prior state condition of each link as recorded in the memory means and the immediate state condition of the link as indicated by the output of the detector means associated with the link scanning means. The memory circuit is adapted, if such a disagreement is assessed, to store the immediate state condition of the individual link as a reference for future comparisons. More specifically, a readable condition is stored in the memory means upon the initial appearance of the first series of pulses at the link terminals of the switching network and through the link scanner means and, conversely, a non-readable condition upon the initial absence thereof. For the generation of hang-up change and answer change conditions, inverter means are provided for a characteristic indication of the absence of the direct-current potential at the output of the detector associated with the link scanner means and, similarly, of a non-readable condition with respect to a link circuit as stored in the memory unit and sensed by the scanning selector means. As is more fully described below, the sequences of readable and non-readable conditions stored in the memory means for originating and terminating calls are not identical.

However, still another feature of this invention relates to the provision of means for controlling the memory means to record the proper sequences of readable and non-readable conditions pertaining to a particular link employed for a communication connection and adapted so as to re-normalize the memory means upon a crosspoint release which signifies the termination of both originating and terminating calls. Accordingly, through the use of such inverter means, a comparison of successive state conditions of each link with the information stored in the memory means with respect thereto during the progress of a call indicates directly the hang-up change and answer change conditions of a particular substation through appropriate AND gate means.

An additional feature of this invention relates to the provision of means for delaying the operation of each of the link scanner, loop scanner and scanning selector means with respect to the counter unit by which they are driven. The advance pulses directed from the central office to step the counter unit also serve to enable the transmission of the change condition of the substation to the central office through the appropriate AND gate means. In order to compensate for the delay introduced by the operation of the individual detector circuits in normalizing to the absence or presence of the first and second series of pulses, the link scanner, loop scanner and scanning selector means are normally advanced a single position with respect to the counter unit by which they are driven. The appearance of an advance pulse from the central office to the counter unit is momentarily delayed until the output of the detector circuits are sampled by the enabling of the appropriate AND gate means thereby and which thereupon becomes effective to step the counter unit to allow the detector circuits to normalize with respect to the next position prior to the appearance of a subsequent advance pulse.

An additional feature of this invention relates to the manner by which the link scanner and the scanning selector means are operated in relation to the operation of the loop scanner means. The loop scanner means is operative on a one-out-of-Y basis where Y is equal to the number of substations served, but the loop scanner controlling means is effective to control the link scanner and the scanning selector means on a one-out-of-X basis where X is equal to the number of link circuits available. Accordingly, the link scanner and scanning selector means are cyclically operated $Y/X$ or Z times for each cyclic operation for the loop scanner means.

A distinguishing feature of this invention relates to the operation of the supervisory system to provide monitoring information of the proper operation of the crosspoint connections comprising the switching network. Each of the change condition indications relating to the operation of a substation has a dual or ambiguous significance due to the fact that the system conditions under which each is developed are not peculiar thereto. This lack of peculiarity results from the fact that a finite interval of time necessarily elapses between the actual change in the operation condition of a particular substation and the affecting of an appropriate crosspoint in the switching network by the central office location. However, the proper significance to be attached to the supervisory information is resolved at the central office location by a comparison of the occurrence of the information pulse with respect to the state condition of the communication connection, i.e. such connection has either been effected or is to be effected or disconnected, as recorded on a link basis in appropriate memory means thereat. For example, the detection of a crosspoint failure indication was mentioned above with respect to the operation of the loop scanning means and the generation of a service request change condition indication. With respect to the two change conditions possible in the controlled operation of the crosspoint connections, i.e., crosspoint closure and crosspoint release, the system conditions which result therefrom are such as to cause the generation of indications which, though identical to hang-up change condition indications for terminating calls or to the absence of repeated service request change condition indications and to answer change condition indications for both terminating and originating calls, respectively, are resolved by appropriate memory means at the central office location upon the occurrence thereof during that interval in which a communication connection is to be effected or disconnected, respectively. Each of these indications appears at the central office location subsequent to a control action thereby to alert the common control to the presence of supervisory information and initiate a processing thereof by the common control unit located thereat which includes the appropriate memory means.

The methods of monitoring the proper closure of crosspoint connections in the case of terminating calls and originating calls are dissimilar. In the case for originating calls, for example, the substation is necessarily in an off-hook condition and the transmission gate associated therewith inhibits the appearance of the first series of pulses at the loop scanning means. Accordingly, the loop scanning means are operative to continually develop double-meaning service-request indications until the central office location directs the closure of the particular crosspoint connection. Upon the closure of this crosspoint connection, the second series of pulses continuously present on the link terminals are directed therethrough to inhibit the loop scanning means. Accordingly, the absence of subsequent double-meaning service-request indications with respect to a particular substation is indicative of the proper closure of a crosspoint connection for the establishment of a communication connection thereto. Therefore, the signal developed by the loop scanning means provides an indication for a service-request condition and a crosspoint failure condition, supra, in addition to indicating by the absence thereof a compliance with a crosspoint closure order from the central office in the case of originating calls.

The manner of monitoring the proper closure of a particular crosspoint connection in the case of a terminating call differs in that the indication generated is identical to that generated to indicate a hang-up change condition. Prior to the central office location directing a closure of a particular crosspoint connection to effect a communication connection, the system conditions are such that the first series of pulses are absent from the link terminal connected to the particular crosspoint connection in the switching network. However, the immediate state condition of the called substation is necessarily one of on-hook and the transmission gate associated therewith allows the appearance of the first series of pulses at the loop terminals of the switching network. Therefore, following a crosspoint closure in the case of a terminating call, the link scanning means becomes responsive to the first series of pulses which now appear through the closed crosspoint connection at the link terminal connected thereto. The appearance following an absence of the first series of pulses at the connected link terminal is recognized by the link scanning means jointly with the memory circuit means, which attest to the prior absence thereof to develop a double-meaning hang-up change condition indication. Therefore, the signal developed by the supervisory system upon the appearance following the absence of the first series of pulses at the link terminal of the switching network indicates a hang-up change condition if a communication connection has been effected as well as a proper closure of a particular crosspoint if such connection is to be effected for a terminating call to a substation.

The last change condition in the operation of a substation for either an originating or a terminating call is that of hang-up whereupon the crosspoint connection is directed to release. Conversely with respect to the monitoring of a crosspoint closure in the case of a terminating call, the monitoring of a proper crosspoint release is effected subsequent to the proper central office action by the recognition of the absence following the appearance of the first series of pulses by the link scanning means and the memory circuit means to generate a double-meaning answer-change condition indication. Therefore, the signal developed by the system upon the absence following the appearance of the first series of pulses at the link terminals of the switching network indicates an answer change condition if a communication connection has been established as well as a proper release of a crosspoint connection if such connection is to be disconnected subsequent to the receipt of a resolved hang-up change condition indication. The ambiguities inherent in these signals as generated are resolved at the central office location by the above-mentioned features relating to memory circuits operative to distinguish the proper sequence of signals to be expected in both the progress of a call and also in response to a proper function of the switching network.

Accordingly, the features of this invention so far described provide supervisory intelligence to the central office in the form of change condition information, as distinguished from state condition information, relating to a particular substation being served as well as monitoring information of the proper operation of the crosspoint connections comprising the remote switching network. The randomness and low average rate of occurrence of the appearances of such information allow for the provision of a further feature of this invention which relates to the employment of phantom circuits as signaling paths over the communication links with a minimum of resultant interfering tones. The information which is transmitted over these phantom circuits operates appropriate indicating devices at the central office common to all of the served substations on a time basis for directly indicating the particular change condition of a substation to initiate appropriate action by the central office equipment. The presence of each indication at the central office provides a flag indication (i. e., a signal indicative of the presence of supervisory information in a specific component circuit) to the common control unit thereof to initiate a sampling of each indicating device to resolve the information contained therein according to the state condition of the communication connection.

Figure 2:
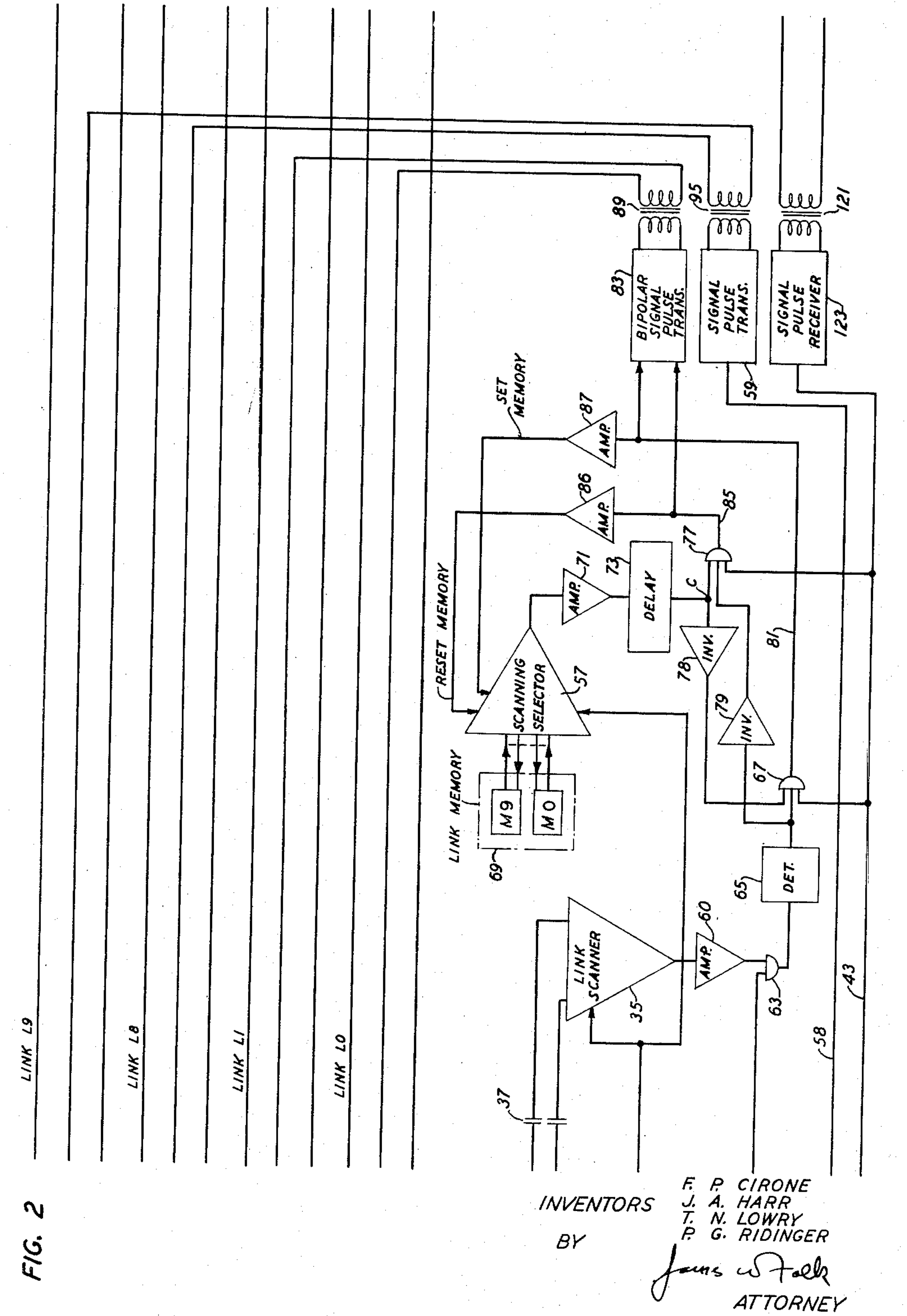
Figures 4, 5, 6, 7, 8:
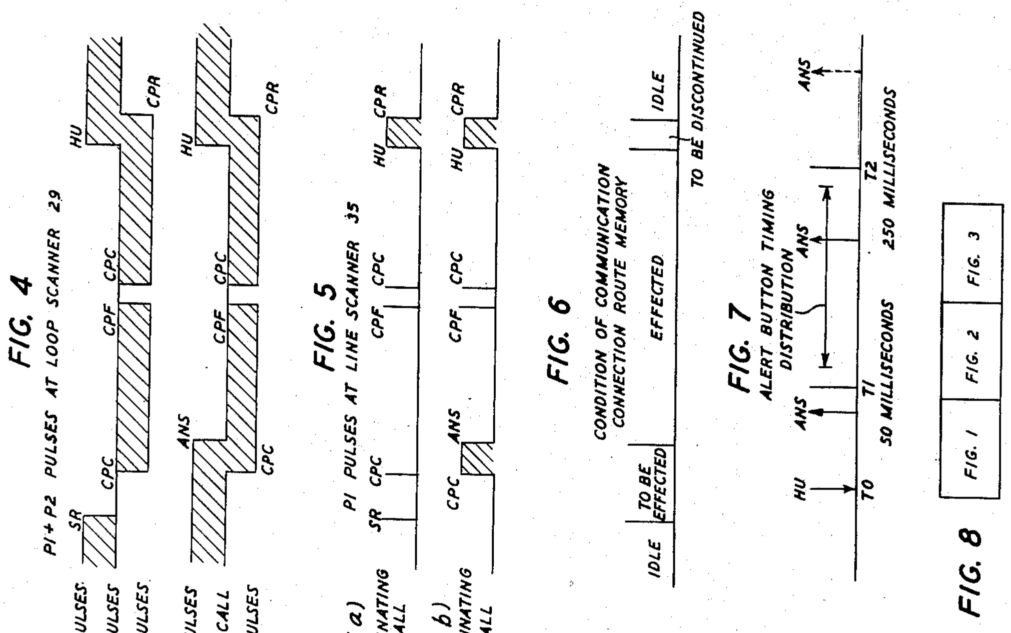
Figure 3:
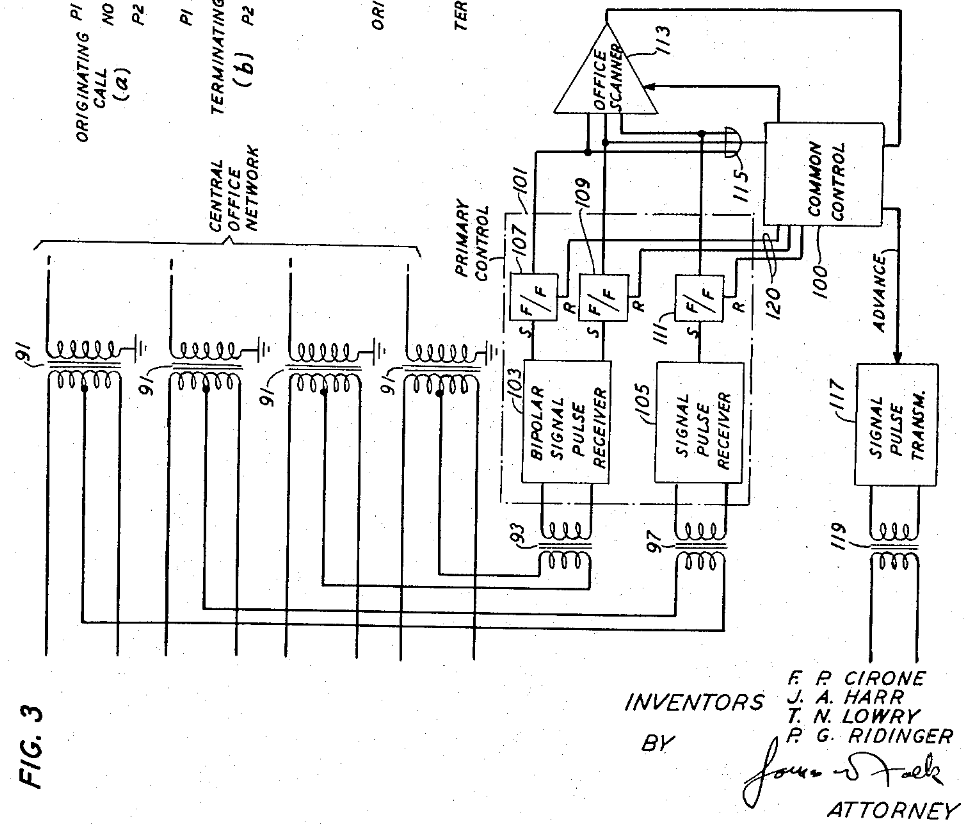

These and other features of the invention will be better understood upon consideration of the following description taken in conjunction with the accompanying drawings in which:

FIGS. 1, 2 and 3 are general circuit representations of a supervisory circuit embodying the principles of this invention and adapted for the transmission of intelligence indicative of the particular change conditions of a plurality of substations provided service in a line concentrator telephone system. FIGS. 1 and 2 show the line concentrating portion of the telephone system which is remotely located from a central office location shown in FIG. 3. FIGS. 1, 2 and 3 are arranged together as shown in the key diagram of FIG. 8;

FIGS. 4(*a*) and 4(*b*) are time diagrams which illustrate the appearances of the P1 and P2 pulses at the loop terminals of a remotely located switching network to be detected by a loop scanning means during the progress of an originating call and a terminating call, respectively;

FIGS. 5(*a*) and 5(*b*) are time diagrams which illustrate the appearances of the P1 pulses at the link terminals of the same remotely located switching network to be detected by a link scanning means during the progress of an originating call and a terminating call, respectively;

FIG. 6 is a time diagram keyed to FIGS. 4 and 5 which illustrates the progress of both an originating call and a terminating call as recorded in the route memory of a common control unit at the central office location; and FIG. 7 is a diagram which illustrates the timing sequence employed by the common control unit at the central office location to distinguish a random disturbance, a flash or alert condition, and a true hang-up.

Referring to FIGS. 1, 2 and 3, a line concentrator telephone system is shown which is adapted to serve a group of substations S00 through S59 over ten communication links L0 through L9 emanating from a central office location to provide a six-to-one concentration. While the illustrative embodiment provides service to 60 substations, it is to be understood that the number of served substations may vary depending upon estimated traffic conditions with respect thereto. In addition, it is to be understood that one of the substations S00 through S59 may represent a group of substations provided with party line service in a manner well known in the art. The equipment which is shown in FIGS. 1 and 2 is located remotely from the central office location shown in FIG. 3 and comprises that apparatus associated with the function of concentrating traffic from the substations S00 through S59 over the links L0 through L9. It is to be further understood that a plurality of line concentrator units such as depicted in FIGS. 1 and 2 or a multiple concentration of served substations may be employed with a single central office location without deviating from the concepts of this invention.

Communication connections are provided between the substations S00 through S59 and the central office location shown in FIG. 3 through the links L0 through L9 which are selectively connectable to particular ones of the substations through the agency of the switching network 1 of the line concentrator unit as controlled by the central office location. The manner in which the switching network 1 is controlled by the central office location does not constitute a part of the present invention. There are numerous examples in the present art of apparatus for affecting a control of the switching network of a line concentrator unit from the central office location. To simplify and particularly direct the description of the present invention, the switching network 1 is shown skeletonized to depict only the terminals thereof. It should be understood, however, that the switching network 1 may comprise such elements that are operative to complete a communication connection therethrough. Examples of such elements are two or three-terminal semiconductor devices, gaseous devices, crossbar switching devices, relay devices, etc., which are adapted to open or close a communication connection.

In the arrangement as shown, each of the substations S00 through S59 is connected to the central office location of FIG. 3 through alternating-current coupling networks in a manner well known in the art. A communication path between a particular substation, e.g., S59, and the central office is established from the repeating coil or transformer 3 of substation S59, the dual primary of which is connected to the subset thereof through a pair of wires 5, through a preselected crosspoint connection in the switching network 1 to a repeating coil 7 associated with a preselected one of the links L0 through L9 and along the preselected link to the central office location. An unbalanced switching operation is performed by the switching network 1 in selectively connecting the substation S59 to an idle one of the trunks L0 through L9. The ground connection provided to the secondary of the repeating coil 3 and the primary of the repeating coil 7 establishes a ground return and creates in that portion of the communication path an unbalanced connection. However, the repeating coil 7 recreates a fully balanced system for the remaining portion of the communication path to the central office location of FIG. 3. It should be evident that the present invention is similarly applicable to systems wherein a balanced switching operation is utilized.

An unbalanced switching method is employed in the illustrative embodiment of this invention wherein a single crosspont is closed in the switching network 1 to provide a communication path from a particular one of the substations S00 through S59 through a selected one of the links L0 through L9. An advantage which can be secured by the employment of an unbalanced switching scheme is that only a single crosspoint need be provided and operated to establish a communication path between a particular substation and the central office location. Further, the switching network 1 is essentially self-contained and conductively isolated from currents induced from power lines and other sources of interference. Further, the repeating coils provide balanced termination for each communication path which effectively cancel longitudinal currents thus reducing noise impairment of speech signals. However, a disadvantage inherent in such schemes is that there is no direct-current connection established upon crosspoint closure between the particular substation and the central office location. In present day telephone systems, whether of the type employing line concentrator units or not, the supervision of served substations is effected by a sampling of the line current condition of a particular substation to determine the immediate state condition thereof. For example, the supervisory systems employed in present day line concentrator telephone systems operate to detect service-request conditions at the remote location on a time basis and, once a communication connection has been established to the substation, further supervision is effected at the central office location on a direct-current basis along the interconnecting link for the determination of both on-hook and off-hook state conditions thereof to be processed for the determination of the actual change condition of the substation. As mentioned above, this invention contemplates no supervision whatsoever at the central office location of the immediate state condition of the substations S00 through S59 but, rather, contemplates the transmission to the central office location from the remote location supervisory information indicative of the actual change condition in the operation of a substation.

The substation equipment with which the present supervisory system may be employed is shown as being of a conventional type and well known in the art. The battery B1 is connected through the resistor 9, through one primary of the repeating coil 3, through the individual subset along the pair of wires 5 in which is serially included the flash device FD and therefrom through the second primary of the repeating coil 3 and the resistor 11 to ground. A capacitor 13 is interposed between the dual primaries of the repeating coil 3 to provide a by-pass for alternating-current signals of the resistors 9 and 11 of the battery feed circuit while avoiding a shunt thereacross to direct-current flow by providing a high impedance thereto. The telephone subset included in the substations S00 through S59 operates conventionally to present a high impedance to loop current flow when in an on-hook condition and a low impedance thereto when in an off-hook condition.

Connected in parallel across the capacitor 13 is a voltage sensitive transmission gate which is illustrated in comprising a diode 19 which is connected in parallel with the capacitor 13 through the resistors 15 and 17. The diode 19 may preferably be of the type commonly referred to as a Zener diode or a conventional diode in combination with appropriate biasing means. The voltage conditions within the substation loop are such that during the on-hook condition of a particular substation, e.g., substation S59, there is low current flow through the substation loop causing a potential to appear across the capacitor 13 which is sufficient to maintain the diode 19 in a low impedance condition. However, an off-hook condition caused by the removal of the receiver at substation S59 results in an increase in the substation loop current supplied from battery B1 through the now low impedance provided by the subset thereto. The resultant decrease in the voltage developed across the capacitor 13 and the diode 19 upon the substation S59 entering into an off-hook state condition is below the breakdown potential of the diode 19. Accordingly, it is evident that the impedance presented by the diode 19 is determined by the current condition in the substation loop and is evidential of the immediate state condition of the substation S59. The flash device FD is, however, operative to provide an open loop condition for substation S59 for a predetermined time interval during an off-hook state condition thereof to generate a flash or alert condition indication as is hereinafter described.

A first series of pulses, hereinafter referred to as P1 pulses, is directed from an oscillator 23 through the capacitor 21 to the cathode of the diode 19, the anode of which is connected through the capacitor 27 to a point A. An individual point A is provided for each of the substations S00 through S59 to provide a sampling point for each of the loop terminals V00 through V59, respectively, of the switching network 1 for the loop scanner 29 which is connected thereto. Point A is also connected to the ungrounded side of the secondaries of the repeating coil 3 associated with each of the substations S00 through S59 through the capacitor 8. Accordingly, the P1 pulses from source 23 appearing through the diode 19 during an on-hook state condition of the associated substation also appear on the unbalanced portion of the communication path. The ungrounded terminals of the repeating coils 3 are connected directly to the loop terminals V00 through V59 of the switching network 1 which correspond to the substations S00 through S59, respectively.

A second series of pulses, hereinafter referred to as P2, pulses, is provided by the source 23 through a phase shifter 31 and is coupled through the amplifying devices 33 to all ten of the link terminals H0 through H9 of the switching network 1. A battery B2 is also connected to each of the link terminals H0 through H9 of the switching network 1 through the amplifying devices 33 to supply hold current to each of the crosspoint connections to maintain them in a conductive state once operated. Accordingly, crosspoint holding power is supplied locally which allows the crosspoint current to be independent of substation current. In such cases, the crosspoint element has a conductive state controlled by the central office location but maintained by current locally supplied. The amplifying devices 33 serve as buffer elements to provide high impedance alternating-current paths to the battery B2 feed circuit to minimize crosstalk between and shunt transmission loss through communication paths in the switching network 1. A link scanner 35 is connected to each of the link terminals H0 through H9 of the switching network 1 through capacitors 37 and is operative to scan each link terminal on a one-out-of-ten basis.

Accordingly, the loop terminals V00 through V59 and the link terminals H0 through H9 of the switching network 1 are continuously sampled by the loop scanner 29 and the link scanner 35 on a time basis for the presence of the P1 or P2 pulses and for the presence of the P1 pulses, respectively. The loop and link scanners 29 and 35, respectively, are stepped synchronously by the units counter 39 which is responsive to advance pulses directed from the common control unit 100 at the central office location. While the common control unit 100 is shown in block form, it may be of the type as substantially set forth in the copending patent application of W. A. Budlong et al., Serial No. 688,386 filed October 7, 1957 now Patent No. 2,955,165 issued October 4, 1960. Contained within the common control unit 100 are counting means (not shown) synchronously operated with respect to unit counter 39 and the tens counter 41, infra, to indicate the count condition thereof at the control office location in a manner hereinafter to be described.

An advance pulse is directed from the central office in a manner hereinafter to be described along a conductor 43 and through a delay network 46 to step the units counter 39. The units counter 39 and a tens counter 41 are adapted to have a combined operation for counting 60 advance pulses in a 10×6 fashion. The units counter 39 recycles upon the application thereto of ten advance pulses, each cyclic operation thereof being effective to step the tens counter 41 which comprises six stages. The loop scanner 29, in response to the counters 39 and 41, scans for the presence of the P1 or P2 pulses at the loop terminals V00 through V59 of the switching network 1 corresponding to the substations S00 through S59, respectively. The substations S00 through S59 are conveniently divided into six groups of ten substations. To effect a scanning on a one-out-of-60 basis, the loop scanner 29 is adapted for a 10×6 operation and is controlled by the counters 39 and 41 to determine the particular group and individual substation which is to be scanned, respectively. The units counter 39, however, operates singly to control the operation of the link scanner 35 in scanning on a one-out-of-ten basis the ten link terminals H0 through H9 of the switching network 1 for the appearance of the P1 pulses thereat. The loop and link scanners 29 and 35, respectively, may be of a type well known in the art and a detailed description thereof is not deemed necessary.

Accordingly, the scanning is provided by the loop scanner 29 and the link scanner 35 for appearance of either P1 or P2 pulses at loop terminals V00 through V59 and the P1 pulses at the link terminals H0 through H9, respectively. The loop scanner 29 operates to scan each of the loop terminals V00 through V59 on a one-out-of-60 basis and the link scanner 35 operates to scan the link terminals H0 through H9 on a one-out-of-ten basis. From the description so far evolved, it is obvious that the link scanner 35 completes six scanning cycles for each scanning cycle of the loop scanner 29. The benefits which may be derived from such operation will be discussed hereinafter with respect to a flash or alert condition, the detection of which is had by a scanning of the link terminals rather than the loop terminals of the switching network 1 due to time requirements imposed by a sequential scanning of the substations S00–S59 and limitations imposed upon the frequencies of the advance pulses which may be employed therefor due to loaded cable transmission characteristics.

At this point, it might be mentioned that the repetition frequency of the P1 and the P2 pulses developed by the source oscillator 23 is superaudible and of the order of twenty kilocycles in one illustrative embodiment. The pulses P1 and P2 are time displaced with respect to each other by the phase shifter or delay 31; in one illustrative embodiment the delay was one-half of a cycle. The choice of a superaudible frequency for the monitoring is desirable as there is a continuous appearance of such pulses throughout the system. For example, the P2 pulses appear continuously on the link terminals HO through H9 of the switching network 1 even during the establishment of a communication connection therethrough to a particular substation. It should be evident that a pair of different superaudible frequencies may be employed instead of the P1 and P2 pulses if appropriate filtering and comparison devices are employed to duplicate the function of the coincidence gating arrangement now to be described.

The loop scanner 29 hereinabove described is operative to conduct the P1 and P2 pulses from oscillator 23 and phase shifter 31, respectively, upon their appearance at the particular loop terminals V00 through V59 of the switching network 1 being sampled. As mentioned above, the loop scanner 29 is responsive to the P1 pulses conducted through the diode 19 when in a low impedance condition during an on-hook condition of the substation S59 and, similarly, to the P2 pulses directed through a closed connection in the switching network 1. A coincidence gating arrangement is connected through an amplifier 49 to the output of the loop scanner 29 and comprises the AND gates 45 and 47 to which the pulse sources 23 and 31 are respectively connected as reference pulses to sensitize the supervisory system only to generated pulses.

During the on-hook state condition of the substation S59, the diode 19 is conductive and the loop scanner 29, when interrogating the loop terminal V59 associated therewith, detects the P1 pulses which are thereupon directed therethrough to the amplifier 49. The output of the amplifier 49 is connected to an input of each of the AND gates 45 and 47. The other input of the AND gates 45 and 47 are connected to the source 23 and phase shifter 31, respectively. AND gates of this type are well known in the art and operate such that an output pulse is directed therefrom only on the simultaneous appearance of pulses on both input leads. It is evident that each time one of the P1 pulses is transmitted through the diode 19 to appear at the loop terminal V59 and through the loop scanner 29 at one input of AND gate 45, the AND gate is coincidently enabled due to the appearance of a pulse at the second input thereof from the pulse source 23. Accordingly, a signal will be directed through the AND gate 45 upon each appearance of a P1 pulse through the diode 19 at the loop terminal V59 each time a sampling thereof is effected by the loop scanner 29 during an on-hook state condition of substation S59. The output of the AND gate 45 and similarly the output of the AND gate 47 are connected to first and second ones of the inputs of the OR gate 50, respectively. The output of the OR gate 50 is connected to the detector 51 which is operative to develop a direct-current characteristic indication of the appearance of either the P1 or the P2 pulses at point A. The output of the detector 51 is connected to a logical inverter circuit 53 of a type well known in the art, which operates to produce an output signal opposite to that of the input signal. Accordingly, only upon the absence of a pulse at the output of the detector 51, which corresponds to an absence of both P1 and P2 pulses at the loop terminal V59 indicating an off-hook state condition of substation S59 and the absence of a connection between loop terminal V59 and any link terminal within the switching network 1, is a pulse directed by the inverter circuit 53 to one of the inputs of the AND gate 55, the second input of which is connected to the conductor 43 upon which the advance pulses appear.

The function of the delay network 46 interconnected between the conductor 43 and the units counter 39 now becomes obvious. It is necessary that the enabling of the AND gate 55 slightly precede the application of the advance pulse to the counter 39 which controls the loop scanner 29, the link scanner 35 and the memory scanner 57, to be described hereinafter, due to the finite time interval required by the detector 51 to normalize in response to either the receipt or absence of the P1 and P2 pulses at the point A. The loop scanner 29 may advantageously be adapted to be positioned one step in advance of the units counter 39 and the tens counter 41. For example, loop scanner 29 is positioned to scan the loop terminal V59 associated with the substation S59 while the count in the counters 39 and 41 identifies substation S58. Accordingly, during the interim between successive advance pulses, sufficient time is provided to allow the detector 51 to develop a characteristic indication of the presence or absence of P1 pulses or P2 pulses appearing at the loop terminal V59. The advance pulse, accordingly, steps the counter, not shown, at the common control unit 100 at the central office and a finite time later enables the AND gate 55 to direct an indication of the substation now associated with that count. After a delay introduced by the delay network 46, the counters 39 and 41 are stepped by the same advance pulse to correlate the operation of the counters 39 and 41 and the counter, not shown, in the common control unit 100 and position the loop scanner 29 to scan the next successive loop terminal, i.e., V00 corresponding to substation S00. However, it must be remembered that it is not the presence of a pulse from the phase shifting source 31 at the particular loop terminal which contributes to the enabling of the AND gate 55 but rather the absence of such pulse due to the effect of the inverter circuit 53. The output of the AND gate 55 is directed along the conductor 58 to a signal pulse transmitter 59.

The apparatus so far described relates to the scanning of the loop terminals V00 through V59 of the switching network 1. In operation, the above-mentioned circuitry provides for the detection of a service-request change condition of the substations S00 through S59. A service-request condition on an originating call is indicated by an off-hook state condition following an on-hook state condition of a substation to increase the loop current therein. This is shown as the point SR in the time chart *a* of FIG. 4 and is characterized by the absence of both P1 and P2 pulses to the loop scanner 29. This results in diode 19 being biased below its breakdown potential to place a high impedance in the path of the P1 pulses. Accordingly, the impedance condition of the diode 19, either high or low, is indicative of the state condition of the individual substation being off-hook and on-hook, respectively. The absence of the P1 pulses through the diode 19 during an off-hook state condition inhibits the AND gate 45 such that the detector 51 normalizes to the absence of P1 pulses and a lack of input condition is directed to the inverter 53. The absence of an input condition at the inverter 53 is productive of an output pulse to the input of AND gate 55 which, upon the application thereto of an advance pulse, directs a pulse along the conductor 58 to the signal pulse transmitter 59. The manner by which such pulses are transmitted to the central office location will be hereinafter described. Accordingly, a signal indicative of a service-request condition is directed from the AND gate 55 and along the conductor 58 to the signal pulse transmitter 59 upon the absence of P1 pulses at the loop terminal associated with the particular substation being scanned by the loop scanner 29 and identified by the counters 39 and 41 upon the stepping thereof by the advance pulse through the delay network 46.

Prior to any action by the central office location upon the switching network 1 to establish a communication path to a particular substation, the crosspoint connection associated with the substation S59 to provide for a connection therefrom to an idle one of the links L0 through L9 is open. Accordingly, the P2 pulses which appear on the link terminals H0 through H9 of the switching network 1 cannot be directed therethrough for detection by the loop scanner 29. This is shown in the time chart of FIG. 4 as occurring between the points SR and CPC. Accordingly, there is a complete absence of the P1 pulses and the P2 pulses at the point A.

Upon the service request being received and the substation S59 identified at the central office in a manner hereinafter to be described, the appropriate crosspoint in the switching network 1 is ordered closed preparatory to the establishment of a communication path along an idle link, e.g., link L0. Until such closure, the P1 and P2 pulses are absent at the point A. However, upon the closure of the appropriate crosspoint connection common to the link terminal H0 corresponding to the link L0 and the loop terminal V59 corresponding to the substation S59, a path can be traced from the source 31 of the P2 pulses, through the amplifier 33 and the now closed crosspoint connection to the loop terminal V59 and through the capacitor 8 to the point A whereat they may be detected by the loop scanner 29. The loop scanner 29 does not distinguish between the P1 pulses and the P2 pulses but rather directs them indiscriminately to the amplifier 49. A distinction is made between the P1 pulses and the P2 pulses by the AND gates 45 and 47, respectively, as a coincidence gate arrangement is provided, as described above, to eliminate the susceptibility of the supervisory system to noise pulses.

The absence of the P2 pulses continues until the appropriate crosspoint connection in the switching network 1 is closed in response to an action by the central office location thereupon. It becomes evident that until such crosspoint connection is closed, a characteristic indication of the absence of both P1 and P2 pulses at the loop terminal V59 is developed by the inverter circuit 53. This condition, however, ceases upon the closure of the crosspoint connection after which the P2 pulses are directed therethrough to the point A and the inverter circuit 53 ceases to enable the AND circuit 55. This condition is shown as the point CPC in the time chart of FIG. 4 and is characterized by the presence of only P2 pulses to the loop scanner 29. Accordingly, the reception at the central office location of a signal from the signal pulse transmitter 59 indicates a service-request condition at the substation being interrogated, i.e., substation S59, and a subsequent reception of such signal upon successive samplings thereof signifies that the crosspoint connection has as yet not been closed. Accordingly, the proper closure of a particular crosspoint connection is indicated at the central office location in the case of an originating call by the absence of a service-request change condition indication subsequent to an operation thereby to effect that closure.

The loop scanner 29 also provides for the monitoring of the crosspoint connection subsequent to the closure thereof by the central office location. The reception of a service-request change condition indication subsequent to such closure may be resolved by the central office location as a crosspoint failure, i.e., an opening of the crosspoint connection due to inherent defects therein or external influences thereon during an off-hook state condition of the corresponding substation. This is shown as the point CPF in time charts of FIGS. 4–5 and similarly characterized as a service-request change condition by the absence of P1 and P2 pulses to the loop scanner 29. The change conditions for originating and terminating calls which can be expected at the central office location with respect to a particular substation are shown in each of the time charts of FIGS. 4–7. It is evident from the above discussion of the operation of the loop scanner 29 that a false opening of a crosspoint connection and the resultant absence of P2 pulses at the loop scanner 29 results in a pulse corresponding to a service-request change indication being directed to the signal pulse transmitter 59. Accordingly, the absence of an indication from the signal pulse transmitter 59 subsequent to a proper crosspoint closure allows for the monitoring of the continuous closure thereof. More particularly in the case of crosspoint closure having been effected for either an originating or a terminating call, the simultaneous absence of both P1 and P2 pulses should not appear to the loop scanner 29 prior to the proper release of the crosspoint by the central office location at the point CPR, hereinafter defined, of FIG. 4; the simultaneous absence thereof subsequent to the point CPR indicating a subsequent service-request change condition. As the record of the progress of the call is maintained in the common control 100, as described hereinafter, an indication to the central office location from the signal pulse transmitter 59 prior to the proper release of a crosspoint connection can be distinguished as a crosspoint failure. The signals transmitted to indicate a service-request change condition and a crosspoint failure are identical save for the occurrence thereof with respect to expected change conditions. Though ambiguity exists, a distinction is made between service-request change condition and crosspoint failure indications in the common control unit 100 at the central office location, as is hereinafter described.

The loop scanner 29 functions solely to detect the service-request change condition of the substations S00 through S59 and false openings of those crosspoint connections through which service is provided thereto; the signal being developed thereby being hereinafter referred to as an SR/CPF signal, i.e., a service-request crosspoint failure signal. All further change conditions which are attributable to the substations S00 through S59 are detected through the agency of the link scanner 35 which senses the presence of only P1 pulses on the link terminal connections H0 through H9 of the switching network 1 at the point B. The output of the link scanner 35 is connected to the amplifier 60 which is, in turn, connected to one of the inputs of the AND gate 63. A second input of the AND gate 63 is connected to the source 23 so as to provide a coincidence gating thereof by the P1 pulses in the manner described with respect to the AND gate 45. The link scanner 35 and associated circuitry are, accordingly, adapted to sense only for P1 pulses, as the AND gate 63 is gated solely by the P1 pulses from source 23 and is not affected by the P2 pulses from phase shifter 31. The output of the AND gate 63 is connected to the detector circuit 65, the output of which is directed to one of three inputs of the AND gate 67. It is evident that, as described above, during an off-hook state condition of substation S59, P1 pulses do not appear at the link terminal H0 of the switching network 1 through the now closed crosspoint connection and there is no output from the detector 65. Although the P2 pulses are being detected at this time by the loop scanner 29 at point A of the loop terminal V59 and appear on the link terminal H0, they are effectively blocked by the coincidence gating requirement of the AND gate 63, i.e., P1 pulses. A second of the input terminals of the AND gate 67 is connected to the conductor 43 so as to be enabled, in a manner described above with respect to the operation of the loop scanner 29 and AND gate 55, slightly in advance of the stepping of the link scanner 35. The third terminal of the AND gate 67 is controlled in a manner to indicate the prior state condition of each of the links L0 through L9 as to the presence of the P1 pulses at the link terminals H0 through H9, respectively, as determined by the immediately preceding sampling thereof by the link scanner 35, hereinafter described.

Accordingly, to two of the input terminals of the AND gate 67 are directed characteristic indications of the immediate state condition and the prior state condition of the particular one of links L0 through L9 along which a communication connection is provided through a now closed crosspoint and to the other input thereof is directed an advance pulse from conductor 43 to effect a comparison of those signals in proper time sequence.

The control of the third terminal of the AND gate 67 is effected by the link memory unit 69 comprising memory units M0 through M9. The memory units M0 through M9 correspond individually to the links L0 through L9, respectively, and are operative to record the state condition thereof with respect to the presence of P1 pulses as determined by the link scanner 35 and associated logic circuitry, hereinafter described. The memory units M0 through M9 may advantageously comprise bistable devices, i.e., magnetic cores, flip-flop circuits, etc., in which may be recorded information indicating the two possible state conditions of each of the links L0 through L9, i.e., P1 pulses present or absent. The memory units M0 through M9 are each adapted to be sampled in a non-destructive manner, i.e., the state of operation thereof is not disturbed by the link memory scanner or scanning selector 57 which is synchronously stepped with the link scanner 35 by the units counter 39. Accordingly, each time the immediate state condition of one of the links L0 through L9 is sampled by the link scanner 35 and an indication thereof directed to the second terminal of AND gate 67, an indication of the prior state condition thereof is applied to the third input terminal of the AND gate 67 in a manner now to be described.

Prior to the generation of an expected hang-up change condition indication in the case of both originating and terminating calls, it is necessary that the substation S59 be in an off-hook state condition and the crosspoint connection associated providing communication connection thereto be closed. Conversely, prior to the generation of an expected answer change condition indication in the case of terminating calls, it is necessary that the substation S59 be in an on-hook state condition and the crosspoint connection associated therewith be similarly closed. It is evident that a closure of the crosspoint in switching network 1 precedes the answer change condition in order to apply ringing signals to the substation. As the crosspoint is closed prior to each of these change conditions, the appearance of the P1 pulses on the link terminals H0 through H9 of the switching network 1, as controlled by the diode 19, occurs only during such time that the substation S59 is in an on-hook state condition which precedes an answer change condition. This is shown graphically in the time diagram of FIG. 5. Conversely, the absence of the P1 pulses at the link terminals H0 through H9 of the switching network 1 can only occur during an off-hook condition of the substation S59 which necessarily precedes a hang-up change condition.

Accordingly, as the crosspoint connection through which a communication connection is provided to the particular one of the substations S00 through S59 is necessarily closed during each of these change conditions, it functions as a memory device to effectively distinguish an answer change condition and a service-request condition of a particular one of substations S00 through S59. For example, it is evident that the off-hook state condition of the substation S59 is common to and initiates both a service-request change condition and an answer change condition thereof. The crosspoint connection, accordingly, serves as a bistable memory device to distinguish therebetween by controlling the application of the P1 and the P2 pulses through the switching network 1 to inhibit the generation of an answer change condition indication prior to and a service-request change condition indication subsequent to a proper crosspoint closure. As the prior state condition of each one of the links L0 through L9 as determined by previous sampling of the particular link is stored in the link memory 69, a detection of a change in the absence to the appearance of P1 pulses and, conversely, from the appearance to the absence of P1 pulses, by the link scanner 35 and associated elements cooperative there with can be interpreted logically as a hang-up change condition and an answer change condition, respectively, in a manner now to be described, such detection being subsequent to the proper closure of a particular crosspoint connection.

In the generation of a hang-up change condition indication, an appropriate crosspoint connection has been closed and the substation S59 has been in an off-hook condition precluding the presence of P1 pulses at the link terminal H0 of the switching network 1. Upon a return of the substation S59 to an on-hook state condition, the resultant biasing of the diode 19 allows for the passage of the P1 pulses through the still closed crosspoint connection to the link scanner 35. The P1 pulses are now directed through the link scanner 35, amplifier 60 and the AND gate 63; a characteristic indication thereof being developed by the detector 65 and applied to the second input terminal of the AND gate 67. Consider now the effect of the memory unit M0 associated with the link L0 to which the substation S59 has been connected through the closed cross-point connection. Prior to the return of the substation S59 to the on-hook state condition, the state condition of link L0 connected thereto was recorded as having P1 pulses absent at the link terminal H0 by a non-readable indication in the memory unit M0 of the link memory 69. The absence of a readable indication in the memory unit M0 is the normal condition thereof in the case of an originating call or, in the case of a terminating call, has been caused by the resetting of the memory unit by a previously occurring answer change condition indication. The scanning selector 57 which is operated synchronously with the link scanner 35 senses the stored information bit in the memory unit M0 and directs an indication thereof to an amplifier 71. The absence of readable condition in the memory unit M0 is indicated through the amplifier 71 and the delay network 73 at the point C. Due to the peculiar operation of the inverter circuit 78, an absence of an indication at the point C provides an opposite or a positive characteristic indication to the third input of the AND circuit 67. Accordingly, in the hang-up change condition, and the three input terminals to the AND circuit 67 are provided with enabling voltages, i.e., the advance pulse along the conductor 43, the output of the detector 65 in response to the P1 pulses applied thereto through the link scanner 35 indicating a return to an on-hook state condition of substation S59, and the positive characteristic indication at the output of inverter circuit 78 due to the absence of a readable indication in the memory unit M0 indicating a previous absence of the P1 pulses on the link L0. The AND gate 67 thereupon directs a pulse along the conductor 81 to the signal pulse transmitter 83 upon the appearance of the advance pulse along the conductor 43; the pulse from transmitter 83 can be resolved as a hang-up change condition of the substation S59 at the central office location.

In a similar manner, the answer change condition in the case of a terminating call, is indicated by the AND circuit 77. The crosspoint connection prior to an answer change condition is necessarily closed for the application of ringing signals to the substation S59. However, the state condition of the substation S59 is on-hook so that P1 pulses passed by diode 19 are detected through the crosspoint connection by the link scanner 35. Upon substation S59 entering into an answer change condition, the off-hook condition of this receiver causes a biasing of the diode 19 such that P1 pulses are not directed therethrough and through the crosspoint for detection by the link scanner 35. Accordingly, an absence following an appearance of P1 pulses through the switching network 1 provides for an absence of direct-current potential from the detector 65 so that the AND gate 67 is not enabled. The output of the detector 65 is, however, connected to the AND gate 77 through the inverter circuit 79; AND gate 77 is, therefore, supplied a positive characteristic indication of the absence of the direct-current potential at the output of the detector 65. The AND gate 77 is further controlled by the memory unit M0. The state condition of the link L0 prior to the removal of the receiver at substation S59 was such that P1 pulses had been appearing thereon, as indicated by a readable indication stored in the memory unit M0. Accordingly, the three input terminals of the AND gate 77 are provided with enabling voltages, i.e., the advance pulse along the conductor 43, the output of the inverter 79 in response to the absence of P1 pulses applied through the closed crosspoint connection, which functions as a memory device, and through link scanner 35 indicating an off-hook state condition of the substation S59, and the presence of a readable condition in the associated memory unit M0 indicating a previous state condition of the link L0 during which P1 pulses were present. Accordingly, the AND gate 77 is now operative to direct a pulse along the conductor 85 to the signal pulse transmitter 83 upon the appearance of an advance pulse along the conductor 43; this pulse from transmitter 83 can be resolved as an answer change condition of the substation S59 at the central office location.

Making specific reference to the time diagrams of FIG. 5, it is evident that the appearance of the P1 pulses at the link terminal H0 precedes an answer change condition in the case of a terminating call and succeeds a hang-up change condition in the case of both originating and terminating calls. The appearance of the P1 pulses at the link terminal H0 preceding an answer change condition commences upon the closure of a crosspoint connection due to the then on-hook state condition of the substation S59. The memory units M0 through M9 are each adapted to be set or reset by a hang-up change condition or an answer change condition indication, respectively, peculiar to that substation provided a communication connection along the links L0 through L9, respectively. As is hereinafter described, the system conditions which result from the closure and release of a crosspoint connection to a substation in an on-hook state condition and the information necessarily stored in the memory units M0 through M9 are such as to enable the AND gates 67 and 77, respectively. Accordingly, upon the appearance of an advance pulse along the conductor 43, an output signal is developed by an enabled AND gate 67 or 77. Thus, the output signal indications of the AND gates 67 and 77 have a dual or ambiguous significance. As the output of the AND gate 67 indicates either a hang-up change condition or a crosspoint closure to a substation in an on-hook state condition, i.e., for a terminating call, the output signal will hereinafter be referred to as an HU/CPC signal. Similarly, as the output of the AND gate 77 indicates either an answer change condition or a crosspoint release, the output signal from gate 77 will hereinafter be referred to as an ANS/CPR signal.

The HU/CPC and ANS/CPR signals are employed to monitor proper operation of the crosspoint connection, as further described hereinafter, upon a resolution of that ambiguity at the central office location. However, these signals are similarly operative to affect the memory units M0 through M9 to provide an indication of the presence or absence of P1 pulses at the link terminals H0 through H9. For example, in the case of an originating call, as illustrated in the time diagrams of FIG. 5($a$), the P1 pulses appear only subsequent to a hang-up change condition whereupon the memory unit M0 is set by the HU/CPC signal through the amplifier 87 to provide a readable indication upon a subsequent sampling thereof by the scanning selector 57. Accordingly, a subsequent absence of P1 pulses at the link terminal H0 affects the inverter 79 such that the AND gate 77 is enabled to develop an ANS/CPR signal upon the appearance of an advance pulse on conductor 43 which can be resolved at the central office location as indicating a proper crosspoint release. Similarly, the ANS/CPR signal generated upon a crosspoint release is operative to reset and normalize the memory unit M0 through the amplifier 86 to provide a non-readable condition therein.

In the case of a terminating call, as illustrated in time diagram of FIG. 5($b$), the HU/CPC signal generated upon a crosspoint closure due to a non-readable condition in the memory unit M0 and the resultant appearance of P1 pulses at the link terminal H0 is operative to set the memory unit M0 through the amplifier 87 to provide a readable condition therein indicating the presence of P1 pulses at the link terminal H0. A subsequent answer change condition of the substation S59 and the resultant absence of the P1 pulses at the link terminal H0 results, due to a readable condition in the memory unit M0, in the enabling of the AND gate 77 upon the appearance of an advance pulse along conductor 43 and the generation of an ANS/CPR signal. The ANS/CPR signal again resets the memory unit M0 to provide a non-readable condition therein indicating the absence of P1 pulses at the link terminal H0, whereupon the reappearance thereof results in the enabling of AND gate 67 to generate an HU/CPC signal indicative of a hang-up change condition of substation S59. The HU/CPC signal and the subsequent ANS/CPR signal effectively set and reset the memory unit M0, respectively, in an identical manner as described for the case of an originating call. Accordingly, the memory unit is normalized upon the completion of both an originating and a terminating call to substation S59. The readable condition to which each of the memory units M0 through M9 is set provides a store for the prior state condition of the individual links L0 through L9 with respect to the presence of the P1 pulses at the link terminals H0 through H9 of the switching network 1. Again referring to the time diagrams of FIG. 5, it is evident that a readable indication is only contained in the memory unit M0 during those intervals corresponding to the lined areas indicated between CPC, the closure of the crosspoint connection, and ANS, the answer change condition of substation S59, in the case of a terminating call and between HU, the hang-up change condition, and the CPR, release of the crosspoint connection, for both originating and terminating calls.

The HU/CPC signals and the ANS/CPR signals thus developed by the AND gates 67 and 77, respectively, have a dual or ambiguous significance which relates to the change conditions of both the particular one of substations S00 through S59 being served and the crosspoint connection through which service is provided thereto. Such ambiguities are resolved at the central office location according to the time relationship of the reception of each of the HU/CPC signals and the ANS/CPR signals with respect to the normal sequence of the progress of state conditions of a communication connection. A record is maintained at the central office location on a link basis of the identity of the particular substation being served on a particular one of the link L0 through L9 in a route memory contained in the common control unit 100. The route memory may advantageously be a barrier grid storage device of the type described in the above-identified A. E. Budlong et al. application or in the Bell System Technical Journal of November 1955 on pages 1241–1264. Upon a service-request change condition having been received and the particular substation, i.e., substation S59, identified, an idle one of the links L0 through L9 is selected and the identity of substation S59 is written into a group of memory spots associated with the selected link in the route memory of the common control unit 100. Accordingly, subsequent change condition indications which are received and identified on a link basis are attributed to substation S59 or the crosspoint connection through which communication connection is provided thereto along that one of the links L0 through L9. The identity of the substation is only erased upon the reception of an ANS/CPR signal indicating a release of the crosspoint connection.

The HU/CPC and ANS/CPR signals providing supervisory information of the crosspoint connection occur subsequent to a control thereof by the central office location as a result of the change in system conditions accompanying such control, as described above. Accordingly, the ambiguity which exists with respect to the HU/CPC and ANS/CPR signals directed to the central office location from the signal pulse transmitter 83 can be resolved thereat according to the time sequence of appearance of these indications. To resolve the ambiguities inherent in the HU/CPC and ANS/CPR signals, a record is simultaneously maintained in the route memory of the common control unit 100 at the central office location of the state of the communication connection to the substation S59 with respect to link L0, i.e., the communication connection is to be effected; the communication connection has been effected; the communication connection is to be disconnected; or the particular link is idle. No information is recorded at the central office location peculiar to the substation S59 during an idle state condition thereof. It becomes evident that, in the case of a terminating call, if an HU/CPC signal is received at the central office location which is identified as peculiar to link L0 at a time when the route memory of the common control indicates that a communication connection is to be effected to the substation S59, the central office location resolves this signal to indicate a proper closure of the crosspoint to provide a communication connection thereto. However, if an HU/CPC signal identified as peculiar to link L0 is received at a time when the route memory of the common control unit indicates that such link is idle, the central office location is able to resolve this signal to indicate an improper or false closure of a crosspoint connection. With respect to the monitoring of a proper closure of a crosspoint connection in the case of an originating call, as was hereinabove described, the absence of subsequent SR/CPF signals to the central office location upon the ordering of a crosspoint connection to close is indicative of the presence of P2 pulses through the switching network 1 to the loop scanner 29 which presupposes the closure thereof. Accordingly, the ambiguity inherent in the HU/CPC signal is resolved according to the appearance thereof at the central office location with respect to the state of the communication connection recorded in the route memory of the common control unit 100. If the communication connection has been effected, the HU/CPC is resolved to indicate a hang-up change condition. Accordingly, a proper closure of a crosspoint connection is indicated for the establishment of an originating or a terminating call along a selected one of the links L0 through L9 by the absence of subsequent SR/CPF signals or by a HU/CPC signal, respectively, at the central office location. Moreover, a false or improper closure of a crosspoint connection is indicated by the appearance of a HU/CPC signal during that time in which the route memory of the common control unit 100 indicates that a communication connection is not to be established.

A monitoring can be effected of the proper release of the crosspoint connection by the central office location. A crosspoint is directed, as the final action of the central office location in serving an originating or a terminating call, to release subsequent to the reception of a HU/CPC signal which has been resolved as a hang-up indication. In a manner similar to the resolution of the ambiguity inherent in the HU/CPC signal, the central office location is able to determine the positioning of an ANS/CPR indication with respect to the state of the communication connection as stored in the route memory of the common control unit 100. If an ANS/CPR signal is received and identified as peculiar to link L0 while the route memory indicates that a communication connection has been effected between link L0 and substation S59, the central office location resolves the signal to indicate an answer change condition. However, if an ANS/CPR signal, which is identified as peculiar to link L0, is received at a time when the route memory of the common control unit 100 indicates that such connection is to be disconnected, the central office location is able to resolve this signal to indicate a proper crosspoint release. As has been described above, an improper release of a crosspoint connection is indicated by the appearance of a SR/CPF signal during that time in which the route memory of the common control unit 100 indicates that a communication connection has been established to the substation S59 and prior to the receipt of a HU/CPC signal indicating a hang-up change condition.

Accordingly, three indications developed by the supervisory system of this invention provide for not only a notification directly to the central office location of the change conditions of the substation being served but also provide a monitoring of the crosspoint connection as mentioned above. The SR/CPF indication serves to notify the central office location of a service-request change condition or of a mid-conversational crosspoint failure, the absence of subsequent indications denoting a proper closure of a crosspoint connection for serving an originating call; the HU/CPC indication serves to notify the central office location of a hang-up change condition or of both an improper closure of a crosspoint connection during such time that a link connected thereto is not to be effected and a proper closure of a crosspoint for serving a terminating call; and the ANS/CPR indication serves to notify the central office location of an answer change condition or of the proper release of a crosspoint connection in response to orders received from the central office. Also, the reception of the ANS/CPR indication with respect to a particular link during such time that a substation is not being served therealong serves to notify the central office location of a malfunction in the supervisory system, e.g., non-synchronous operation of the tens counter 41 and the units counter 39 with respect to corresponding counter units, not shown, contained in the common control unit 100.

The outputs of the AND gates 67 and 77 are each connected through the conductors 81 and 85 to respective ones of the two inputs of the signal pulse transmitter 83, respectively. The signal pulse transmitter 83 is operative to generate a pulse of predetermined polarity according to which of two inputs thereof is enabled. The signal pulse transmitter 83 may be any type of well-known bipolar pulse transmitter from which is provided an output signal of predetermined polarity according to which one of two inputs is activated or more specifically, may be of the type disclosed in the copending I. Dorros patent application, Serial No. 824,433, filed on even date herewith. Upon the reception of an HU/CPC signal on conductor 81, the operation of the signal pulse transmitter 83 is such that a positive pulse is developed thereby. Upon the reception of an ANS/CPR indication on the conductor 85, a negative signal is developed by the signal pulse transmitter 83. Accordingly, the positive and negative pulses developed by the signal pulse transmitter 83 and indicative of HU/CPC and ANS/CPR signals, respectively, are distinguishable with respect to each other. The practicability of employing a bipolar signal pulse transmitter for the transmission of HU/CPC and ANS/CPR signals, respectively, is due to the fact that such signals cannot occur simultaneously with respect to a same link as the dual significance of each of these signals is correspondingly mutually exclusive. The output of the signal pulse transmitter 83 is connected through the repeating coil 89 to the links L0 and L1 in a phantom circuit arrangement.

Phantom circuits are well known in the art and provide means whereby an additional signaling channel may be provided over two existing communication connections. Such phantom circuits, for example, are described on page 204 of Communication Engineering, Third Edition by Everett and Annar. Accordingly, each terminal of the secondary winding of the repeating coil 89 is connected to one of the midpoints of the secondary windings of the repeating coils 7 associated with links L0 and L1, each of which serves as a side circuit for the signaling channel established between the signal pulset transmitter 83 and the central office location. Basically, the operation of the phantom circuit is such that currents directed from the secondary of the repeating coil 89 divide equally from the midpoints of the secondary windings of the repeating coils 7 in links L0 and L1 and flow in the same direction in the two wires comprising each, respectively. At the far end of the links L0 and L1, the currents in each of the two wires produce equal and opposing magnetomotive forces in the primary windings of the repeating coil 91 associated therewith and so are effectively canceled in the secondary windings thereof which are connected to the central office switching network, not shown. Connected at the midpoint of each of the primary windings of the repeating coils 91 arranged in the links L0 and L1 at the central office location is one terminal of the primary winding of repeating coil 93. Accordingly, pulses developed by the signal pulse transmitter 83 and directed over the links L0 and L1 in a phantom arrangement are received at the primary windings of the repeating coil 93. It should be noted that a high degree of balance between the wires comprising each of the links L0 and L1 is not required for this application. In phantom circuits, in order to avoid interference between the individual communication paths and the phantom circuit which is superimposed thereon, a balancing of the conductors comprising each communication path is desired to effect an equal distribution of current from the midpoint of the repeating coil along each conductor. An unbalance of such conductors is productive of crosstalk or, in the case of continuous signaling pulses in the audible range, an interfering tone. However, due to the randomness and relative infrequency of the pulses developed by the signal pulse transmitter 83, an interfering tone will not appear. The pulses directed from the signal pulse transmitter 83 do cause a slight interference in the form of random blips on the communication paths. However, to eliminate such blips would require balancing of the links which, for all practical purposes, is not necessarily warranted when comparing the cost of such balance with the slight annoyance caused by the transmission of random signals over the superimposed phantom circuit.

Similarly, a phantom signaling circuit is provided for the signal pulse transmitter 59 and utilized for the transmission of SR/CPF indications to the central office location. The signal pulse transmitter 59 is connected to the primary winding of the repeating coil 95. The terminals of the secondary winding of the repeating coil 95 are connected to the midpoints of the secondary windings of the repeating coils 7 contained in the links L8 and L9, respectively. Accordingly, a second phantom signal circuit is established to the primary windings of the repeating coils 91 contained in the links L8 and L9 at the central office location, the midpoints of which are connected to opposite terminals of the primary winding of the repeating coil 97.

The advance pulses which are generated in the common control unit 100 are directed to a signal pulse transmitter 117 for transmission to the remote location. As the signals appear continuously, a separate signaling path is provided therefor between the repeating coil 119 located at the central office location and repeating coil 121 located at the remote location. The secondary of the repeating coil 121 is connected to a signal pulse receiver 123 which is operative upon the receipt of advance pulses thereto to direct an output signal along the conductor 43 to which it is connected.

The SR/CPF signals, the HU/CPC signals and the ANS/CPR signals are directed along the phantom circuits superimposed upon the links L8 and L9 and the links L0 and L1, respectively, to the primary control unit 101 at the central office location through the secondary windings of the repeating coils 97 and 93, respectively. The secondary winding of the repeating coil 93 is connected to the bipolar signal pulse receiver 103 in the primary control unit 101 which is operative to distinguish between the bipolar pulses which are representative of the HU/CPC signals and the ANS/CPR signals, respectively. Similarly, the secondary winding of the repeating coil 97 is connected to the signal pulse receiver 105. The bipolar signal pulse receiver 103 is operative upon receipt of a positive signal or a negative signal through the repeating coil 93 thereto to direct an output to set the flip-flop devices 107 or 109, respectively, to indicate the receipt of an HU/CPC signal or an ANS/CPR signal, respectively. Similarly, the signal pulse receiver 105 is operative upon the receipt of a signal through the repeating coil 97 to set the flip-flop device 111 to indicate the receipt of an SR/CPF signal.

Specifically, the flip-flop devices 107, 109 and 111 may be conventional type bistable multivibrator devices well known in the art which are adapted to assume one of two stable states of operation upon receipt of an input pulse thereto. The flip-flop devices 107, 109 and 111 are normally reset. The output of each of the flip-flop devices 107, 109 and 111 is multipled to the office scanner 113 and to the OR gate 115. The operation of the OR gate 115 is such that a pulse is directed therefrom to the common unit 100 upon a setting of any one of the flip-flop devices 107, 109 or 111. Accordingly, it is only upon the setting of one of the flip-flop devices 107, 109 or 111 due to the appearance of a HU/CPC signal, an ANS/CPR signal or a SR/CPF signal, respectively, that an output is directed from the OR gate 115 to provide a flag condition alerting the common control unit 100 to the presence of supervisory information in the primary control unit 101. The appearance of a flag condition in the primary control unit 101 operates to initiate a scanning of the outputs of the flip-flops 107, 109 and 111 by the office scanner 113 under the control of the common control unit 100 to provide a determination of which of the flip-flop devices 107, 109 and 111 has been set. It is evident that there is not a continuous scanning of the flip-flop devices 107, 109 and 111 but that such scanning is only effected during a time in which supervisory information is contained in the primary control unit 101.

At that time when a flag condition is received in the common control unit 100 through the OR gate 115, transmission of advance pulses to control the remote scanning is momentarily stopped until the supervisory information contained in the primary control unit 101 is resolved. The manner by which the advance pulses are transmitted to the remote location is hereinabove described. Accordingly, the supervisory information contained in the primary control unit 101 cannot be mutilated by subsequently received supervisory information until identification and resolution thereof has been effected in the manner now to be described. An identification of the supervisory information with respect to a particular one of the substations S00 through S59 and of the links L0 through L9 is provided by means of counter units, not shown, contained in the common control unit 100 which may be identical to the tens counter 41 and the units counter 39 shown in FIG. 1. These counter units are accordingly adapted to provide identification on both a substation basis and on a link basis. For example, if a determination is made upon a scanning of the outputs of the flip-flop devices 107, 109 and 111 that the flip-flop device 111 is in a set condition indicating the receipt of a SR/CPF signal, the common control unit 100 can readily determine on a substation basis the identity of the particular one of the substations S00 through S59 to which it is peculiar by referring to the count contained in both counter devices. However, if either of the flip-flop devices 107 or 109 is determined as being in a set condition indicating the receipt of a HU/CPC signal or an ANS/CPR signal, respectively, the common control unit 100 can readily determine on a link basis the identity of the particular one of the links L0 through L9 by referring to the counter contained therein corresponding to the units counter 39 of FIG. 1. As the identity of the particular substation is recorded in the route memory of the common control unit 100 on a link basis, a correlation between the particular one of the links L0 through L9 as identified and the particular one of the substations S00 through S59 provided service therethrough is determinative of that substation which has undergone such change condition. As described above, not only is the identification of the particular one of the substations S00 through S59 stored in the route memory on a link basis but also appropriate memory spots are provided in which are contained the state condition of a communication connection. Accordingly, the receipt of a particular SR/CPF signal, HU/CPC signal or ANS/CPR signal and a comparison of such signal with the information of the state condition of the communication connection provided to a particular substation as recorded in the route memory of the common control unit 100 is effective to resolve the supervisory information indicated thereby in the manner which has been hereinabove described. Upon the receipt of a flag condition at the common control unit 100 and the subsequent identification of that one of the flip-flop devices 107, 109 and 111 which has been set, the set flip-flop device is thereupon reset by the common control unit 100 along the conductor 120.

In order to provide that a terminating call directed to the substation S59 may be transferred to another one of the remaining substations S00 through S58 when a customer group service is being provided by a line concentrator unit as shown in FIGS. 1 and 2, the common control unit 100 at the central office location is adapted to recognize a flash or alert condition from the substation S59. The flash or alert condition need not be indicated by a separate characteristic signal in itself but rather may comprise a resolved hang-up change condition indication followed within a predetermined interval of time by a resolved answer change condition indication both identified with the substation S59. More specifically, a flash or alert signal is indicated when an ANS/CPR signal is received at the central office location during that time when the route memory of the common control unit 100 indicates that the communication connection is to be disconnected as illustrated in FIG. 7. In situations wherein a P.B.X service is provided to a customer group, a flash or alert condition is affected manually at the substation and detected by a human operator at the switchboard unit who would thereupon transfer the call. However, in automatic telephone systems of the type illustrated wherein human operators and switchboard units are not employed, it is necessary that a flash or alert condition be automatically recognized at the central office location. The generation of a flash condition indication is effected through the agency of a flash device FD which is included in the subset unit of each of the substations S00 through S59 and is operative to enable the transmission gate comprising the diode 19 for a predetermined interval of time. The initial appearance of the P1 pulses at the link terminal H0 results in the generation of a HU/CPC signal as hereinabove described. The HU/CPC signal so generated occurs at a time when the route memory of the common control unit 100 indicates that a communication connection has been effected and the signal, accordingly, is resolved as a hang-up change condition indication. Referring to the time diagram of FIG. 7, the appearance of this hang-up condition appears at the central office at the time T0. The crosspoint connection is not, however, immediately released but rather a timing operation commences in the common control unit 100 with respect to the link L0. This timing may be effected within the common control unit 100 by any one of several means well known in the art. For example, a physical circuit may be advantageously employed which produces a timing wave, each occurrence of which is effective to mark time spots in an appropriate register device contained within the common control unit 100 which may be referred to for a determination of elapsed time.

From the above description of the generation of an HU/CPC signal, it is evident that the generation thereof resulting from the initial appearance of P1 pulses at the link terminal H0 of the switching network 1 results in information being stored in the route memory of the common control unit 100 to indicate that the communication connection is to be disconnected. Accordingly, the next action to be performed in the normal sequence of the progress of a communication connection is that of releasing the crosspoint connection by the central office location. In this sequence, there is no further supervisory information normally expected from the substation S59. It is evident that the ANS/CPR signal generated in response to the release of the crosspoint connection occurs subsequent to a control operation by the central office location. However, the flash device is operative after a predetermined interval of time to again inhibit the transmission gate comprising the diode 19 to prevent the appearance of the P1 pulses at the link terminal H0. The resultant absence of the P1 pulses at the link terminal H0 results in the generation of an ANS/CPR signal as hereinabove described. Accordingly, the flash device may be, for example, a control switch which is capacitively timed to determine the conductive state of the transmission gate and, accordingly, the appearance of P1 pulses at the link terminal H0. The substation S59 during this interval of time remains in an off-hook state condition. The cross point connection is maintained in a closed condition until such time that an HU/CPC signal can be resolved as indicating a true hang-up change condition as distinguished from the initiation of a flash condition.

Referring to the time diagram of FIG. 7, the tolerances of the flash device may be advantageously determined to create system conditions for the generation of an ANS/CPR signal subsequent to time T1 (50 milliseconds) and prior to time T2 (250 milliseconds) after the generation of an HU/CPC signal. As a convenient rate of scan by each of the loop scanner 29 and link scanner 35 for each of the substations S00 through S59 and links L0 through L9, respectively, is one step per two milliseconds, the link scanner 35 which is operative to detect the flash condition has a scanning cycle time of 20 milliseconds. Accordingly, if the ANS/CPR signal is received prior to a predetermined time, say 50 milliseconds after the reception of the HU/CPC signal in order to allow for any variance in the scanning rate of the link scanner 35, the HU/CPC signal previously received is regarded as a random disturbance and the communication connection reentered in the route memory of the common control unit 100 as still being effected or established. However, if the ANS/CPR signal has not occurred within an arbitrary time, say 250 milliseconds, after the reception of the HU/CPC signal, the common control unit 100 can recognize the HU/CPC signal previously received as a true hang-up change indication and disconnect the communication connection of substation S59. The identity of the substation S59 which has been recorded on a link basis with respect to the link L0 in the route memory of the common control unit 100 is thereupon erased and the link L0 indicated as being idle. However, if the ANS/CPR is received subsequent to 50 milliseconds and prior to 250 milliseconds after the reception of the HU/CPC signal, the common control unit 100 resolves this signal as indicating a flash condition at the substation S59.

When a flash condition has been determined as appearing on the link L0 through which the substation S59 is being provided a communication connection, the crosspoint connection is maintained closed but the link L0 is connected at the central office location to a dial digit receiver, not shown, individual to the link through the central office switching network. The previously connected substation, which may be either one of the remaining substations S00 through S58 or a substation elsewhere in the telephone system, is momentarily removed from the communication connection.

The availability of a dial digit receiver may be indicated to the substation S59 by the transmission of an identifiable tone in a well-known manner thereto from the central office location. The unavailability of a dial digit receiver at the central office location upon the receipt of a flash condition from the substation S59 may be indicated by the absence of such identifiable tone. Upon a determination of the availability of a dial digit receiver, substation S59 thereupon proceeds to dial the identification of the particular substation to which the previously connected substation is to be connected, preceding this dialing operation by a predetermined dial code to indicate whether the call is to be transferred or a conference call established. Upon a dialing operation by the substation S59 having been completed and a conference call indicated, the previously connected substation is connected to a conference circuit, not shown, of a type well known in the art. A communication connection is also established by the central office from the conference circuit, not shown, through a crosspoint connection common to an idle link terminal H2 and loop terminal V0 to establish a communication connection along an idle link L2 to the substation S00. If one of the links L0–L9 is not available for a conference call, such unavailability may be indicated by the transmission of an identifiable tone to substation S59 in a manner well known in the art. The link L0 associated with the substation S59 is similarly connected to the conference circuit, not shown, to effect the establishment of a three-way communication connection. If, however, the substation S59 does not choose to establish a conference connection, it may return to an on-hook state condition upon the receipt of a second tone which indicates that the substation S00 has been identified by the central office location and a link is available to establish a communication connection to substation S00. The return of the substation S59 to an on-hook state condition results in the generation of an HU/CPC signal indicating a hang-up change condition and the appropriate crosspoint connection is released in the manner hereinabove described. Accordingly, the previously connected substation is now connected directly to the link L2 and an appropriate crosspoint connection closed in the switching network 1 to establish a communication connection therefrom to the substation S00.

It is to be understood that the above-described arrangement is illustrative of the application of the principles of this invention. Numerous other arrangements may be devised by those skilled in the art without departing from the spirit and scope of the invention.

What is claimed is:

1. In a telephone system, a plurality of substation loops, gating means connected to each of said substation loops, each of said gating means being operative to assume a functional condition responsive to the condition of the substation loop connected thereto, a switching network, means for applying a first train of pulses to one side of said gating means, means for applying a second train of pulses to one side of said switching network, the other side of said switching network being connected to said substation loops, and means connected to said other side of said switching network and the other side of said gating means for detecting the appearance thereat of said first train of pulses and said second train of pulses.

2. In a line concentrator telephone system, a plurality of substation loops, gating means individually connected to each of said loops so as to be in their low impedance state for one condition of said loop connected thereto and to be in their high impedance state for the other condition of said loop connected thereto, a plurality of link connectors, a switching network for connecting said link connectors and said loops, said links being connected to one side of said switching network, a first source of a first train of pulses, a second source of a second train of pulses, means for applying said first pulses to one side of each of said gating means, means for applying said second pulses to said one side of said switching network, means including first scanner means connected to the other side of said gating means and to the other side of said switching network for detecting the presence of said first and said second trains of pulses, and means including second scanner means connected to said one side of said switching network for detecting the appearance on said link connectors of said first pulses.

3. In a line concentrator telephone system, the combination set forth in claim 2 further comprising memory means for storing information as to the state of each of said link connectors, means for scanning said memory means in synchronism with the scanning of said link connectors by said second scanner means, means for combining the outputs of said second scanner means and said memory scanning means, and means connected to said combining means for controlling the setting of said memory means.

4. In a line concentrator telephone system, the combination as set forth in claim 3 wherein said combining means includes a first and second AND gate, first and second inverting means, means for applying the output of said second scanner means to said first AND gate and through said first inverting means to said second AND gate, and means for applying the output of said memory scanning means to said second AND gate and through said second inverting means to said first AND gate.

5. A supervisory system for a telephone system for transmitting to a central office location information respecting the change in use condition of substation loops and link connectors comprising a central office location, a plurality of substation loops, a switching network having one side connected to said substation loops, a plurality of link connectors connected to the other side of said switching network and extending to said central office location, means connected to said one side of said switching network for detecting a first change in use condition of said substation loops, means connected to said other side of said switching network for detecting a different change in use condition of said substation loops, and means for transmitting signals to said central office indicative of said changes in use condition of said substation loops.

6. In a telephone system, a plurality of substation loops having a number of state conditions, a central office location having a plurality of link connectors emanating therefrom, a switching network for providing a connection between one of said loops and a preselected one of said link connectors, said network having a plurality of loop terminals connected one to each of said loops and a plurality of link terminals connected one to each of said link connectors, a source of first pulsating signals, a plurality of transmission gating means corresponding one to each of said loops for connecting said source of first signals to that one of said loop terminals connected to said corresponding loop, each of said gating means being controlled by the present state condition of said corresponding loop, a source of second pulsating signals comprising delay means connecting said source of first pulsating signals to each of said link terminals, and means for scanning each of said loop terminals on a time basis for determining the appearance of said first and said second pulsating signals thereat.

7. In a supervisory system for telephone systems, a plurality of substation loops to be supervised, each of said loops having a number of state conditions, a central office location having a plurality of lings emanating therefrom, a switching network having a plurality of loop terminals and a plurality of link terminals, means coupling each of said plurality of loops to a preselected one of said loop terminals, means coupling each of said plurality of links to a preselected one of said link terminals, said switching network being operative to provide an interconnection between one of said loop terminals and a preselected one of said link terminals, a first source of first pulsating signals, a second source of second pulsating signals, means controlled by the present state condition of a particular one of said loops for electrically connecting said first source to said loop terminal coupled to said particular one of said loops, means for connecting said second source to each of said link terminals, first means for determining the appearance of said first and said second signals at each of said loop terminals, second means for determining the appearance of said first signals at each of said link terminals, and means for synchronously operating said first and said second means.

8. In a telephone system, a subscriber loop to be supervised, said loop having a first and a second state condition, a central office location, switching means for establishing a communication path between said loop and said central office location, signaling means adapted to be normally operative for transmitting supervisory signals to said central office location, first means controlled by said loop in said first condition to inhibit said signaling means, said signaling means being therefore operative while said loop is in said second condition, and second means operative upon the establishment of said communication path and while said communication path is maintained to inhibit said signaling means.

9. In a telephone system, a substation loop having a first and a second state condition, a central office location having a transmission link emanating therefrom, a switching network for interconnecting said loop and said link, said network having a loop terminal connected to said loop and a link terminal connected to said link, a source of first pulses, transmission gating means controlled by said loop during said first condition for electrically connecting said first source to said loop terminals, a source of second pulses connected to said link terminals, means connected to said loop terminal for determining the presence thereat of said first pulses through said transmission gating means and said second pulses through said network, coincident gating means responsive to pulses from said source of first pulses and from said source of second pulses for connecting said determining means to said loop terminal, and transmisison means connected to said determining means, said transmission means including inverter means whereby an indication is transmitted only upon a simultaneous absence of said first and said second pulses at said loop terminal.

10. In a telephone system, a plurality of substation loops to be supervised, each of said loops having a first and a second state condition, a central office location having a plurality of links emanating thereform, a switching network having a plurality of loop terminals connected one to each of said loops and a plurality of link terminals connected one to each of said links, said network being operative to selectively connect one of said loop terminals and a preselected one of said link terminals by providing an internal connection therethrough, a source of first pulses, a plurality of gating means each controlled by corresponding ones of said loops in said first condition for connecting said source of first pulses to said loop terminal connected to said corresponding loop, a source of second pulses connected to each of said link terminals, scanner means for determining on a time basis the appearance of said first and said second pulses at each of said loop terminals, said second pulses being directed along said internal connection through said network, said scanner means including detector means for indicating the presence or absence of said first and said second pulses, and inverter means connected to said detector means whereby an indication is only provided upon the simultaneous absence of said first and said second pulses at each of said loop terminals.

11. In a telephone system in accordance with claim 10 further comprising means for directing said indication to said central office location, said directing means including means for providing alternating-current pulses responsive to each of said indications and phantom circuit paths superimposed on selected pairs of said links.

12. In a telephone system, a plurality of substation loops to be supervised, each of said loops having a first and a second state condition, a central office location having a lesser plurality of links emanating therefrom, a switching network having a plurality of loop terminals connected one to each of said loops and a plurality of link terminals connected one to each of said links, said switching network being operative to provide an interconnection between one of said loop terminals and a preselected one of said link terminals, means controlled by each of said loops in said first condition for providing a first series of pulses to said loop terminals, means for providing a second series of pulses to each of said link terminals, scanning means for determining the appearance of said first and said second series of pulses at each of said loop terminals on a time basis, inverter means responsive to said scanning means for providing an indication upon the simultaneous absence of said first and said second pulses, and means for directing said indication to said central office location, said directing means including gating means responsive to said central office location whereby said indication is directed in a time slot corresponding to said loop terminal being scanned.

13. In a telephone system, a substation loop to be supervised having a first and a second state condition, a central office location, a switching network for connecting said loop to said central office, inhibiting means controlled by said loop in said first state condition, normally operative means responsive to be disabled by said inhibiting means, said normally operative means providing an indication signifying a second state condition for said loop means, effective upon the operation of said network in connecting said loop to said central office location to inhibit said normally operative means, and means for directing said indications generated by said normally operative means to said central office location, said indications being characteristic of said loop having entered into said second state condition and a non-operation of said network.

14. In a supervisory system, a plurality of substation loops to be supervised, each of said loops having a first and a second state condition, a central office location, a switching network having a plurality of loop terminals for connecting predetermined ones of said loops to said central office location, means controlled by individual ones of said loops in said first state condition to provide a first indication at said loop terminals connected to said individual loops, means effective upon said individual loop having been acted upon by said network to provide a second indication at said connected loop terminal, means selectively connectable to each of said loop terminals on a time basis, said connectable means being responsive to said first and said second indications, and normally operative signaling means responsive to be inhibited by said connectable means, said signaling means including inverter means and gating means whereby an absence of both said first and said second indications at said connected loop terminal is indicated in a corresponding time slot to the central office.

15. In a telephone system, a plurality of substation loops, a central office location having a plurality of link connectors emanating therefrom, a switching network having a plurality of loop terminals connected to corresponding ones of said loops and a plurality of link terminals connected to corresponding ones of said link connectors, said network being operative to connect predetermined ones of said loop terminals to preselected ones of said link terminals, means connected to each of said loop terminals for providing a detectable condition to those of said loop terminals corresponding to said loops in a first state condition, said detectable condition appearing on those of said link terminals connected through said network to said loops in said first state condition, scanner means for determining the presence of said detectable condition at each of said link terminals on a time basis, memory means for storing information regarding the presence or absence of said detectable condition at each of said link terminals, comparison means responsive to said scanner means and to said memory means for generating a first signal upon the initial appearance of said detectable condition at each of said link terminals and a second signal upon the initial absence of said detectable condition at each of said link terminals, and means for directing said first and said second signals to said central office location in a particular time slot corresponding to each of said link connectors.

16. In a telephone system in accordance with claim 15 wherein said comparison means comprises first gating means connected to said scanner means, second gating means connected to said memory means, first inverter means connecting said scanner means to said second gating means, and second inverter means connecting said memory means to said first gating means.

17. In a telephone system, a plurality of substation loops, a central office location having a plurality of links emanating therefrom, switching means having a plurality of loop terminals connected one to each of a corresponding one of said loops and a plurality of link terminals connected one to each of a corresponding one of said links, means connected to each of said loop terminals for providing a detectable condition thereat, said means being inhibited by each of said loops in a second state condition of operation so that said detectable condition appears only at those of said link terminals connected through said network to those of said loop terminals in a first state of operation, first scanner means for providing an indication upon the determination of said detectable condition at each of said link terminals, memory means comprising a plurality of memory units corresponding one to each of said link terminals for storing information regarding the state of said detectable condition thereat, each of said memory units storing a readable condition to indicate the absence of said detectable condition at said corresponding link terminal, second scanner means synchronously operated with said first scanner means for reading said information stored in said corresponding memory units, said second scanner means being operative to provide an indication for each readable condition, and comparison means connected to said first and said second scanner means for providing signals indicative of the appearance of an indication from either said first or said second scanner means, said comparison means being operative on a time basis.

18. In a telephone system in accordance with claim 17 wherein said comparison means comprises a first gating means connected to said first scanner means and a second gating means connected to said second scanner means, first inverter means connecting said first scanner means to said second gating means, and second inverter means connecting said second scanner means to said first gating means.

19. In a telephone system in accordance with claim 17 further comprising control means responsive to each operation of said comparison means for placing said corresponding memory unit in a predetermined condition with respect to said corresponding link terminal.

20. In a telephone system, a plurality of substation loops each having a first and a second state condition of operation, a central office location having a plurality of links emanating therefrom, a switching network having a plurality of loop terminals connected one to each of said loops and a plurality of link terminals connected one to each of said links, said network being operative to connect a predetermined one of said loops to a preselected one of said links, means including a Zener diode controlled by each of said loops in said first condition and a source of pulsating signals for providing a pulsating signal to said loop terminal connected to said controlling loop, said pulsating signals being absent from said connected loop terminal during that period in which said controlling loop is in said second condition, scanner means for determining the presence of said pulsating signals at each of said link terminals on a time basis, said scanner means including detector means responsive to the coincidence of said pulsating signals directly from said source and from said link terminals, memory means for providing information regarding the presence or the absence of said pulsating signals at that one of said link terminals being presently scanned by said scanner means, comparison means responsive to said scanner means and to said memory means, said comparison means including gating means responsive to said detector means and said memory means, and means for enabling said gating means whereby the output of said comparison means is provided in a time slot corresponding to that one of said link terminals being presently scanned by said scanner means.

21. In a supervisory system, a plurality of terminal points to be supervised having a first and a second state condition, said first condition of each of said terminal points being characterized by the appearance thereat of a pulsating signal, said second condition of each of said terminal points being characterized by the absence thereat of said pulsating signal, and means for determining a change in the state condition of each of said terminal points, said determining means comprising; detector means for sampling the present state condition of each of said terminal points on a time basis, said detector means being responsive to said pulsating signals; memory means for storing information regarding the presence or absence of said pulsating signals at each of said link terminals; and first and second gating means, said first gating means being responsive to said detector means and said memory means upon a change in state condition from the absence to the appearance of said pulsating signals at each of said terminal points, said second gating means being responsive to said detector means and said memory means upon a change in state condition from the appearance to the absence of said pulsating signals at each of said terminal points; and means for enabling said first and said second gating means on a time basis.

22. In a supervisory system for providing information to a central office location directly as change condition information as distinguished from state condition information, a substation loop to be supervised, a central office location having a link emanating therefrom, a switching network having a loop terminal connected to said loop and a link terminal connected to said link to provide an interconnection therebetween, means connected to said loop terminal and controlled by said loop in a first state condition to provide a detectable condition thereat, said detectable condition being absent therefrom while said loop is in a second state condition, first means responsive to an absence of said detectable condition at said loop terminal to provide a first indication signal, means effective upon said interconnection having been established to inhibit said first means, means for determining the initial appearance or the initial absence of said detectable condition at said link terminal, said determining means including memory means for storing information as to the previous continuous presence or previous continuous absence of said detectable condition at said link terminal and detection means presently responsive to said detectable condition at said link terminal, said determining means being operative to generate a second indication signal upon the initial appearance and a third indication signal upon the initial absence of said detectable condition at said link terminal, transmitting means for directing said first, said second and said third indication signals to said central office location, and a plurality of indicating devices located at said central office location individually responsive to be operated by said first, said second and said third indication signals, respectively.

23. In a telephone system, a plurality of substation loops, each of said loops having a first and a second state condition, a switching network having a plurality of loop terminals connected one to each of said loops, a source of pulsating signals, a plurality of gating means each controlled by a corresponding one of said loops in said first state condition for effectively connecting said source to said loop terminal connected to said corresponding loop, each of said plurality of gatig means being controlled by said corresponding loop in said second state condition for effectively disconnecting said source from said loop terminal connected to said corresponding loop, and additional means associated with each of said corresponding loops, said additional means being operative during said second state condition of said corresponding loop for further controlling said gating means controlled by said corresponding loop whereby said source is effectively connected to said loop terminal connected to said corresponding loop for a predetermined period of time.

24. In a supervisory system, a substation loop, a central office location having a link emanating therefrom, a switching network having a loop terminal connected to said loop and a link terminal connected to said link for providing an interconnection therebetween, first means connected to said loop terminal and controlled by said loop in a first state condition for providing a detectable condition thereat, said detectable condition being absent therefrom while said loop is in a second state condition, flashing means for further controlling said first means whereby said detectable condition is provided at said loop terminal for a predetermined time interval during said second state condition of said loop, said detectable condition appearing along an established interconnection at said link terminal, means for determining the appearance of said detectable condition at said link terminal, said determining means including memory means for storing information as to the previous continuous presence or absence of said detectable condition at said link terminal, said determining means being operative to generate a first indication signal upon the initial presence and a second indication signal upon the initial absence of said detectable condition at said link terminal, transmitting means for directing said first and said second indication signals to said central office location.

25. In a telephone system, a central office location having a plurality of links emanating therefrom, a substation loop having first and second operational conditions, switching network means having a plurality of link terminals individually connected to said links and a loop terminal connected to said loop, said network means being operative to provide a connection between said loop terminal and a preselected one of said link terminals, means for providing continuous detectable conditions at said preselected link terminal responsive to the coincidence of said first operational condition of said loop and of a first operational condition of said network means, and means responsive to the detectable condition present at said predetermined link terminal for transmitting signals to said central office location indicative of a change in said detectable condition.

26. In a telephone system as in claim 25 wherein said means for transmitting signals indicative of a change in said detectable condition includes means for providing alternating-current signals, and phantom circuit paths superimposed on selected pairs of said links.

27. In a telephone system in accordance with claim 25 wherein said first condition of said loop is an on-hook condition, and wherein said means for providing detectable conditions at said predetermined link terminal comprises means responsive to the on-hook condition of said loop to provide pulsating signals to said loop terminal whereby a connection of said network between said loop terminal and said predetermined link terminal operates to provide said pulsating signals to said predetermined link terminal.

28. In a telephone system in accordance with claim 18, transmitting means responsive to the output of said comparison means including bipolar transmission means for producing a first polarity signal corresponding to the operation of said first gating means and a second polarity signal corresponding to the operation of said second gating means, and a phantom circuit path superimposed on a selected pair of said links.

29. A telephone system as in claim 1, wherein said gating means comprises Zener diode means connected across said loop to operate in response to the operational condition thereof.

30. In a telephone system, a plurality of substation loops to be supervised each having a first and a second state of operation, a central office having a plurality of links emanating therefrom, switching means having a plurality of loop terminals individually connected to said loops and a plurality of link terminals individually connected to said links for providing interconnections between predetermined ones of said loops and links, means controlled by each of said loops in said first state for providing a first detectable condition at said loop terminal connected to the controlling one of said loops, means controlled by the interconnection of said network for providing said first detectable condition at an interconnected one of said link terminals and a second detectable condition at an interconnected one of said loop terminals, first signaling means for generating signals responsive to the detectable conditions present at said loop terminals, second signaling means operative for generating signals indicative of a change in detectable condition at said link terminals, means for synchronizing said first and second signal generating means, and means for transmitting information indicative of said signals to said central office.

31. A telephone system as in claim 30 wherein said means for providing said first and second detectable conditions comprises a source of first pulsating signals, means responsive to said first state at one of said loops for transferring said pulsating signals to said loop terminals connected to that one of said loops, and means for providing second pulsating signals to said link terminals; wherein said first signaling means comprises means for sequentially scanning said loop terminals for said first and second detectable conditions, gating and inverter means for producing an output responsive to the absence of both of said conditions at said loop terminals, and first transmitting means for generating signals for transfer to said central office; wherein said second signaling means comprises means for sequentially scanning said link terminals for said first detectable condition, means for remembering the condition detected at each of said link terminals, means for comparing the present and remembered conditions at each of said link terminals, and means including bipolar transmitting means responsive to a difference in present and remembered conditions from said comparing means for generating signals for transfer to said central office; and further comprising means for time synchronizing said first and second signaling means with said central office.

References Cited in the file of this patent

UNITED STATES PATENTS

| | | |
|---|---|---|
| 2,688,662 | Den Hertog et al. | Sept. 7, 1954 |
| 2,727,094 | Flowers et al. | Dec. 13, 1955 |
| 2,894,072 | Abbott et al. | July 7, 1959 |
| 2,924,666 | Brooks et al. | Feb. 9, 1960 |
| 2,957,949 | James et al. | Oct. 25, 1960 |
| 2,962,555 | Abbott et al. | Nov. 29, 1960 |
| 2,976,367 | Bruce et al. | Mar. 21, 1961 |